US010500963B2

(12) United States Patent
Sikroria et al.

(10) Patent No.: US 10,500,963 B2
(45) Date of Patent: Dec. 10, 2019

(54) VEHICLE DRAG REDUCTION AND ELECTRICITY GENERATION SYSTEM

(71) Applicant: SMART AUTO LABS INC., Huntington, NY (US)

(72) Inventors: Shivam Sikroria, Jersey City, NJ (US); Divyam Sikroria, Jersey City, NJ (US)

(73) Assignee: SMART AUTO LABS INC., Huntington, NY (US)

( * ) Notice: Subject to any disclaimer, the term of this patent is extended or adjusted under 35 U.S.C. 154(b) by 0 days.

(21) Appl. No.: 15/685,460

(22) Filed: Aug. 24, 2017

(65) Prior Publication Data
US 2017/0361715 A1 Dec. 21, 2017

Related U.S. Application Data

(63) Continuation-in-part of application No. 14/961,282, filed on Dec. 7, 2015, now Pat. No. 9,802,492.

(51) Int. Cl.
B60L 8/00 (2006.01)
B62D 35/00 (2006.01)
(Continued)

(52) U.S. Cl.
CPC ............. B60L 8/006 (2013.01); B60K 16/00 (2013.01); B60L 58/24 (2019.02); B62D 35/00 (2013.01);
(Continued)

(58) Field of Classification Search
CPC ...... B60K 2016/006; B60L 8/00; B60L 8/006
See application file for complete search history.

(56) References Cited

U.S. PATENT DOCUMENTS 3,374,849 A * 3/1968 Redman ................ B60K 16/00
180/2.2
3,556,239 A * 1/1971 Spahn ..................... B60K 1/00
180/2.2
(Continued)

FOREIGN PATENT DOCUMENTS

CN 201771672 U 3/2011
CN 204140278 U 2/2015
(Continued)

OTHER PUBLICATIONS

Gagnon, L., et al., "Simulation of a rotating device that reduces the aerodynamic drag of an automobile", Transactions of the Canadian Society for Mechanical Engineering, Apr. 2011, p. 229-249, v 35, n 2.
(Continued)

Primary Examiner — Bryan A Evans
(74) Attorney, Agent, or Firm — Moritt Hock & Hamroff LLP; Bret P. Shapiro

(57) ABSTRACT

Systems and methods effective to reduce a drag coefficient in a vehicle are described. A system methods may receive first air directed towards an air intake structure at a first speed. The air intake structure may transform the first air into second air of a second speed. The system may direct the second air from the air intake structure to a tunnel structure. The tunnel structure may include an entrance and an exit, where a cross-sectional area of the entrance may be less than a cross-sectional area of the exit. The tunnel structure may expand the second air into expanded air. A third speed of the expanded air may be less than the second speed of the second air. The system may create a second drag coefficient, where the second drag coefficient may be less than the first drag coefficient.

18 Claims, 10 Drawing Sheets

(51) Int. Cl.
  *B60K 16/00* (2006.01)
  *B60L 58/24* (2019.01)
(52) U.S. Cl.
  CPC ......... *B60K 2016/006* (2013.01); *Y02T 10/90* (2013.01)

(56) References Cited

U.S. PATENT DOCUMENTS

| | | | |
|---|---|---|---|
| 3,621,930 A * | 11/1971 | Dutchak | B60K 16/00 180/2.2 |
| 4,460,055 A | 7/1984 | Steiner | |
| 4,632,205 A | 12/1986 | Lewis | |
| 5,280,827 A | 1/1994 | Taylor et al. | |
| 5,322,340 A | 6/1994 | Sato et al. | |
| 5,584,355 A | 12/1996 | Burns | |
| 5,986,429 A | 11/1999 | Mula, Jr. | |
| 6,138,781 A * | 10/2000 | Hakala | F03D 9/32 180/2.2 |
| 6,685,256 B1 * | 2/2004 | Shermer | B60J 5/108 296/180.1 |
| 6,857,492 B1 | 2/2005 | Liskey et al. | |
| 6,882,059 B1 | 4/2005 | Depaoli | |
| 7,147,069 B2 | 12/2006 | Maberry | |
| 7,338,335 B1 * | 3/2008 | Messano | B60G 13/14 180/65.22 |
| 7,347,294 B2 | 3/2008 | Gonzalez | |
| 7,641,005 B2 | 1/2010 | Cong | |
| 7,665,554 B1 | 2/2010 | Walsh | |
| 7,854,278 B2 | 12/2010 | Kaufman | |
| 8,191,955 B2 | 6/2012 | August | |
| 8,274,169 B2 | 9/2012 | Schopf | |
| 8,359,864 B2 | 1/2013 | Cong | |
| 8,476,863 B2 | 7/2013 | Paasch | |
| 8,627,913 B1 | 1/2014 | Otterstrom | |
| 8,646,550 B2 | 2/2014 | Penev | |
| 8,770,649 B2 | 7/2014 | Praskovsky et al. | |
| 8,777,297 B2 | 7/2014 | Meredith et al. | |
| 9,845,124 B1 * | 12/2017 | Ingram | B60L 8/003 |
| 2002/0153178 A1 | 10/2002 | Limonius | |
| 2009/0314567 A1 | 12/2009 | Harrington | |

FOREIGN PATENT DOCUMENTS

| | | |
|---|---|---|
| TW | M466831 U | 12/2013 |
| WO | 2010124659 A1 | 11/2010 |
| WO | 2011160602 A1 | 12/2011 |

OTHER PUBLICATIONS

Jory, K., et al., "Computational drag analysis in the under-body for a sedan type car model", International Conference on Energy Efficient Technologies for Sustainability (ICEETS), 2013, p. 765-70.

International Search Report and Written Opinion for counterpart International Patent Application No. PCT/US16/60558 dated Jan. 24, 2017, 12 pages.

* cited by examiner

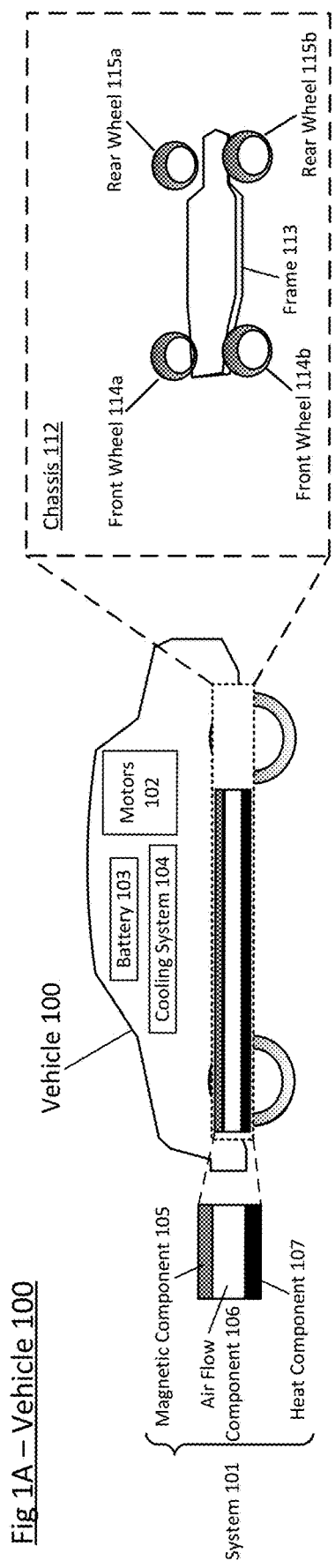
Fig 1A – Vehicle 100
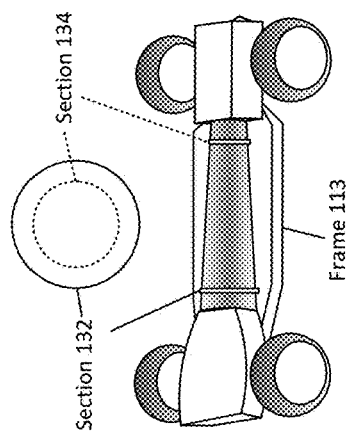
Fig. 1C – Air Flow Component 106
(Side Perspective View)
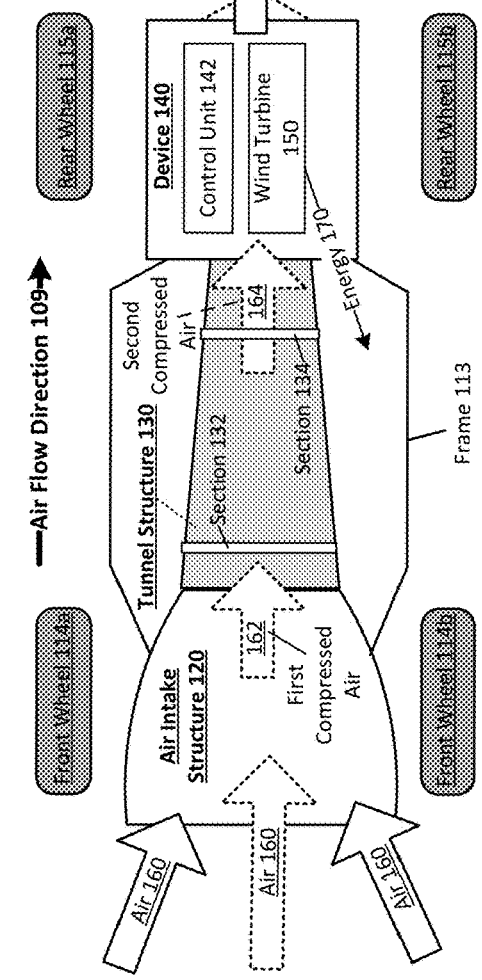
Fig 1B - Air Flow Component 106 (Top Cut-Away View)

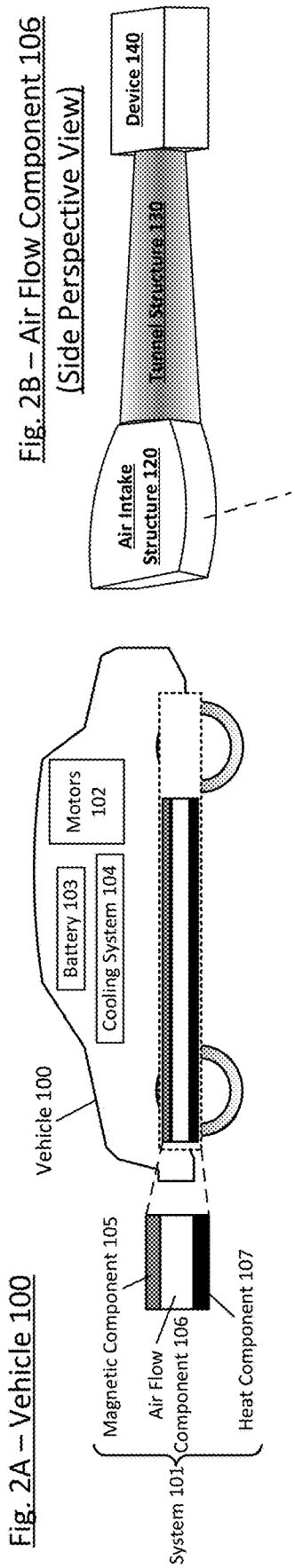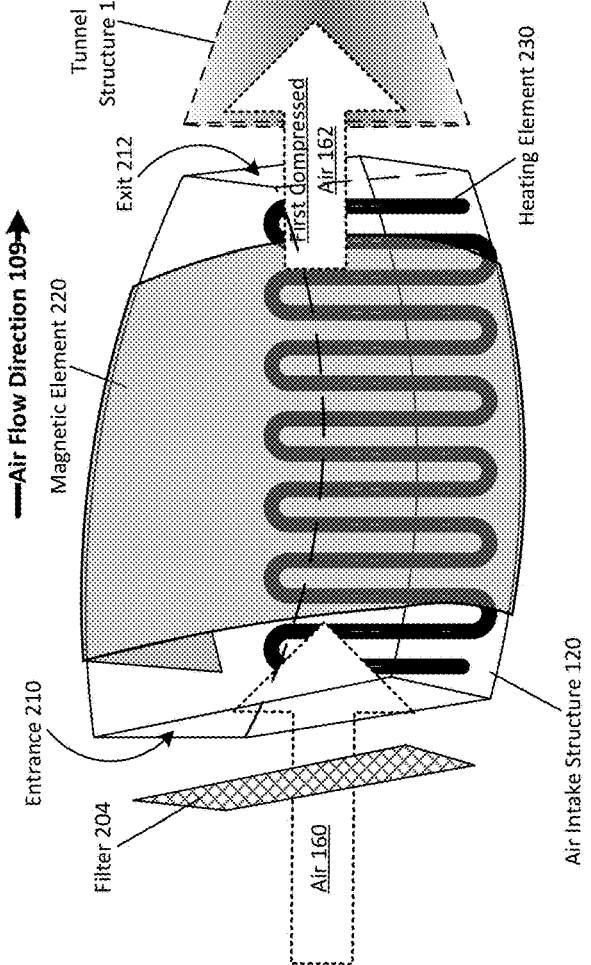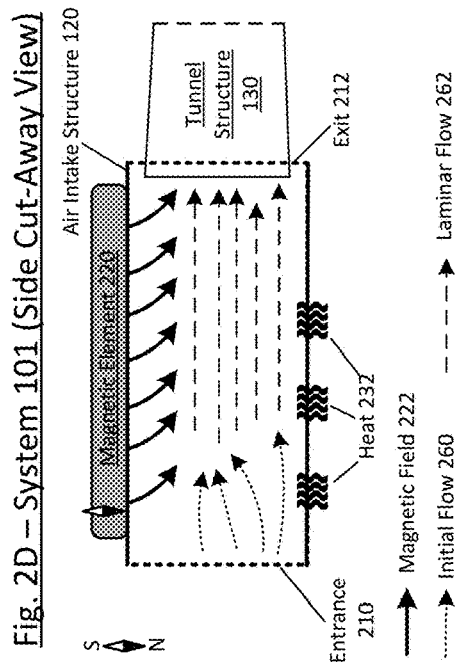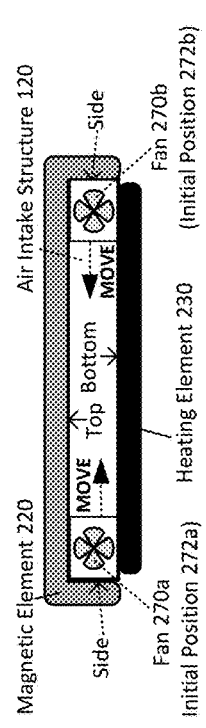

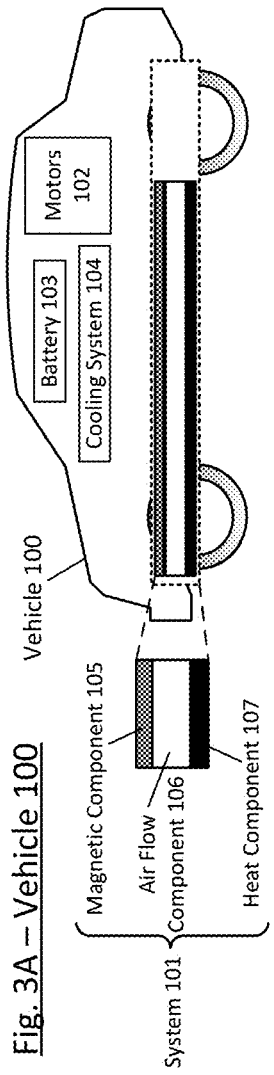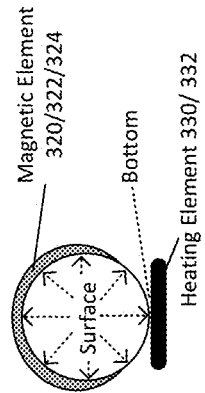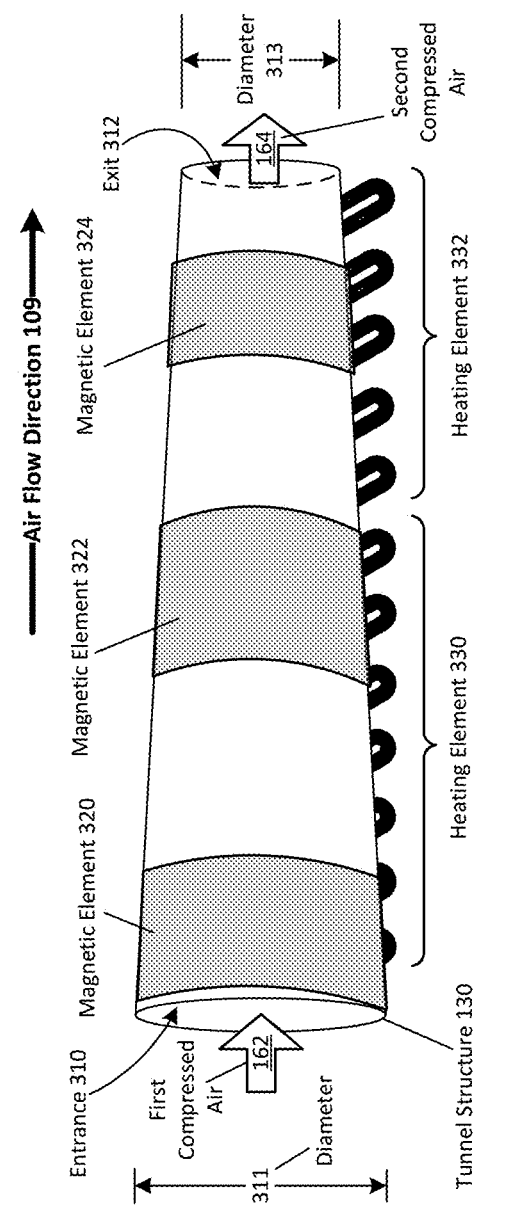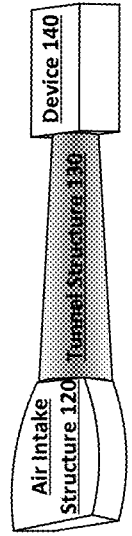

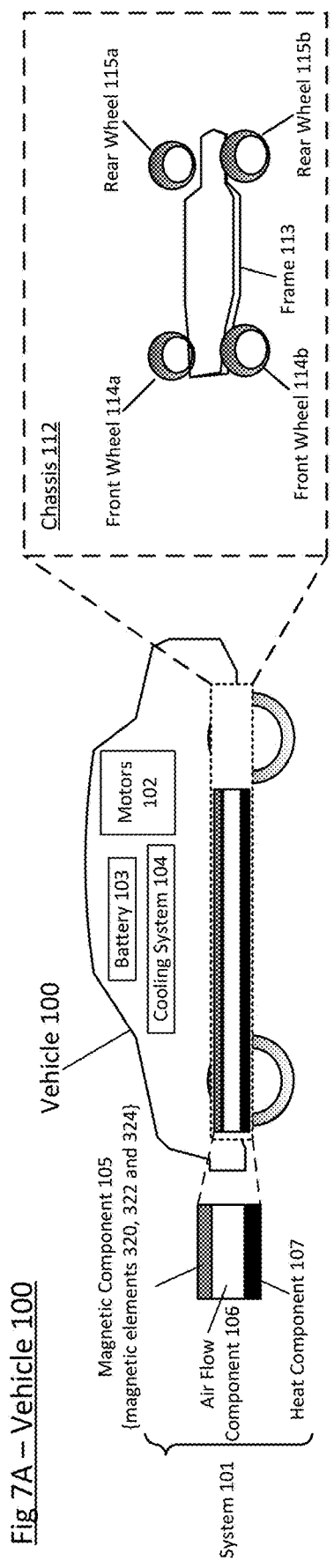
Fig 7A – Vehicle 100
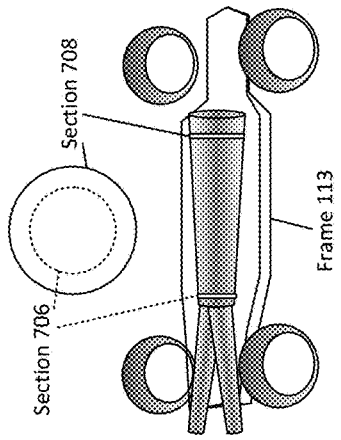
Fig. 7C – Air Flow Component 106
(Side Perspective View)
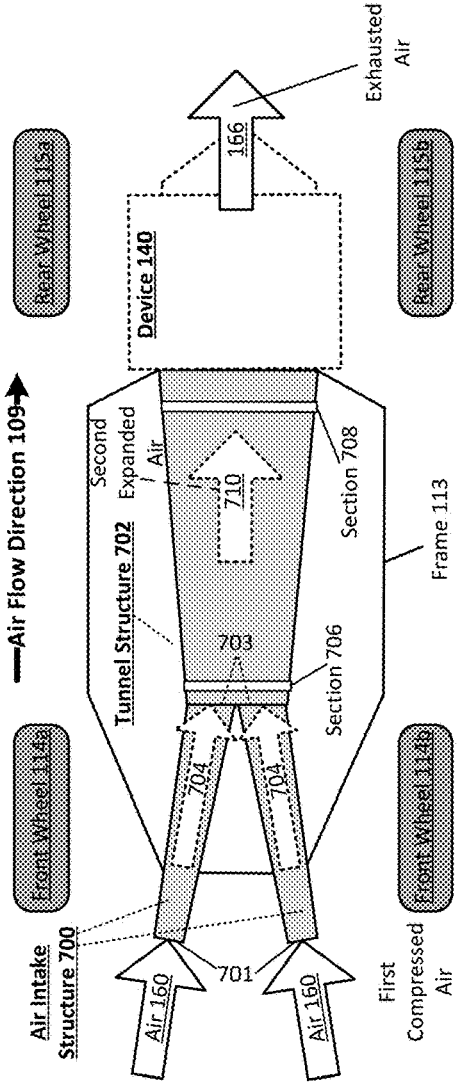
Fig 7B - Air Flow Component 106 (Top Cut-Away View)

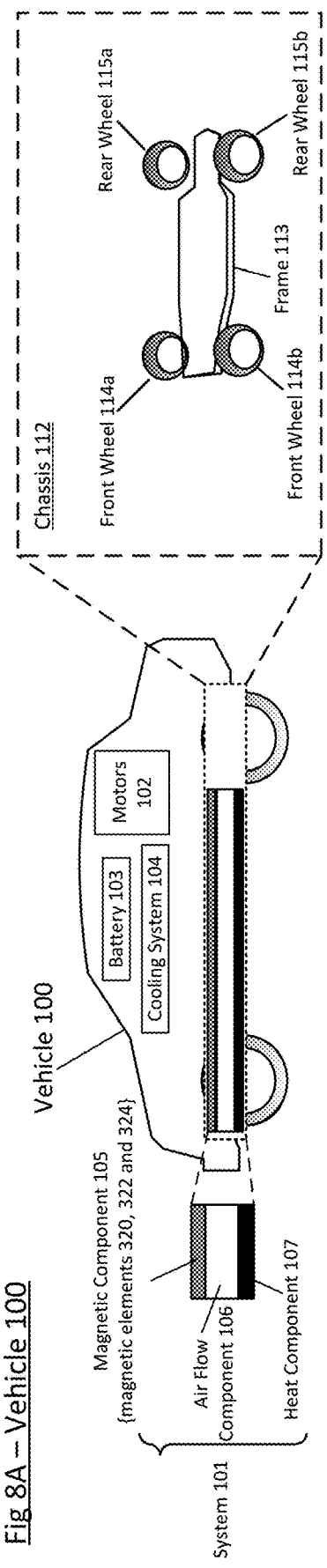
Fig. 8A – Vehicle 100
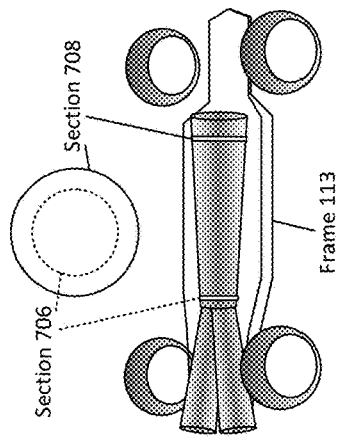
Fig. 8C – Air Flow Component 106 (Side Perspective View)
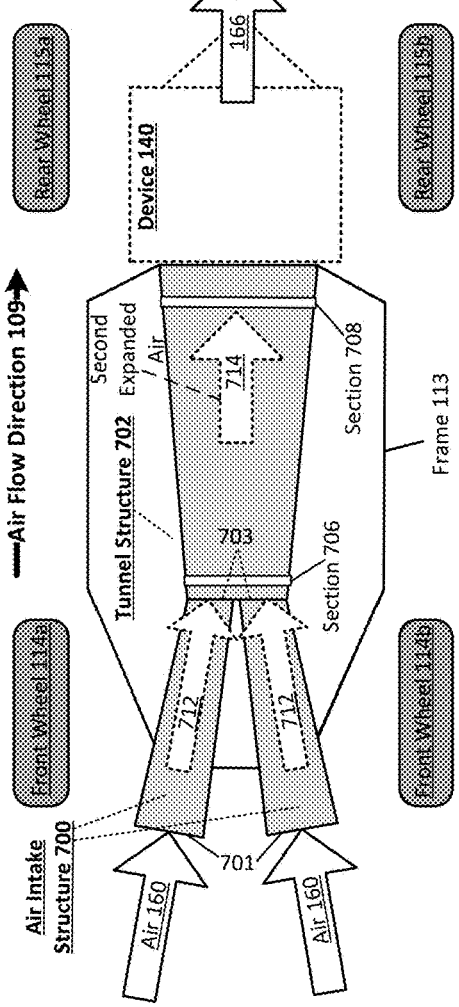
Fig. 8B – Air Flow Component 106 (Top Cut-Away View)

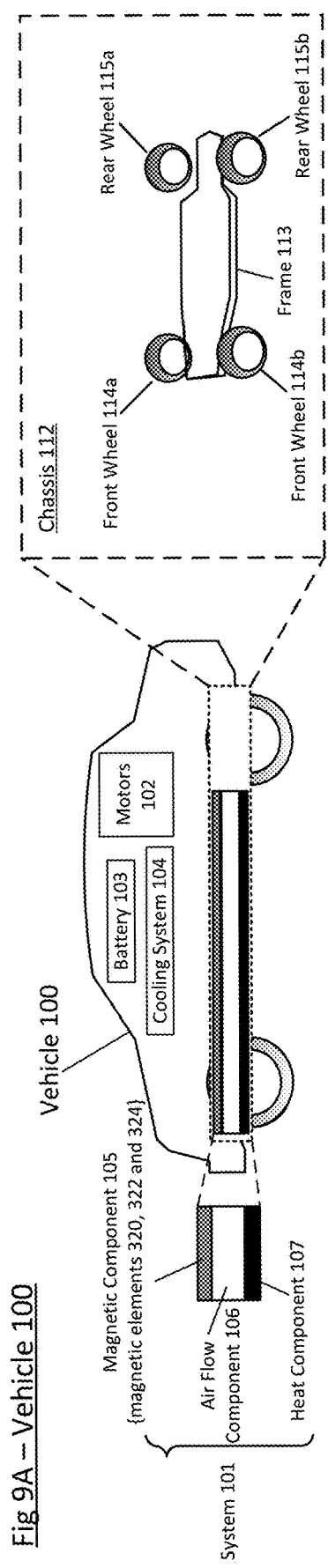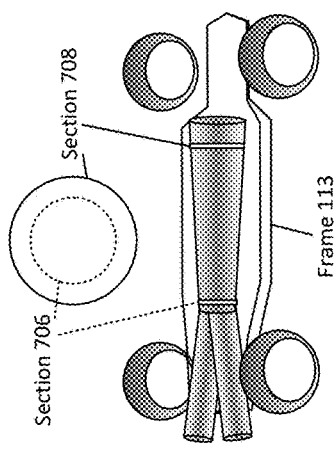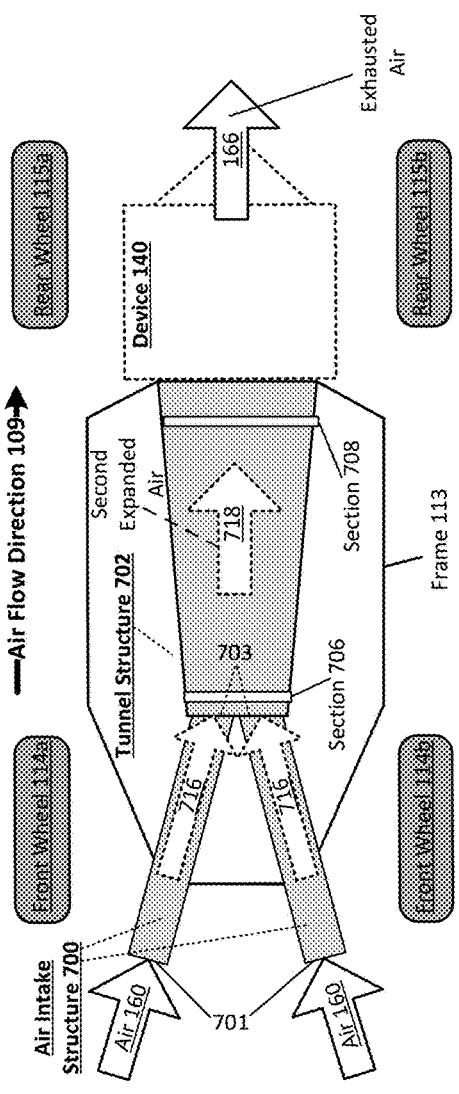

VEHICLE DRAG REDUCTION AND ELECTRICITY GENERATION SYSTEM

This application is a continuation in part under 35 U.S.C. § 120 of U.S. application Ser. No. 14/961,282 filed on Dec. 7, 2015, the entirety of which are hereby incorporated by reference.

BACKGROUND

Unless otherwise indicated herein, the materials described in this section are not prior art to the claims in this application and are not admitted to be prior art by inclusion in this section.

A vehicle in motion may experience a drag resulting from forces acting opposite to the motion of the vehicle. The drag may affect a speed of the vehicle. The vehicle may demand a particular amount of energy to propel the vehicle to reach a desired speed. A reduction of the drag may cause the vehicle to demand less energy to propel the vehicle to the desired speed.

SUMMARY

In some examples, vehicles comprising structure effective to reduce a drag coefficient are generally described. A vehicle may include a battery, and a motor configured to be in communication with the battery. The vehicle may further include a chassis. The chassis may include a frame, where the frame may include a first drag coefficient when the frame moves through space. The chassis may further include one or more sets of front wheels coupled to the frame, and one or more sets of rear wheels coupled to the frame. The chassis may further include a transmission coupled to at least one of the set of front wheels and one of the set of rear wheels. The chassis may further include an air intake structure including a first entrance with a first cross-sectional area and a first exit with a second cross-sectional area. A first relationship between the first and second cross-section area may be effective to receive first air directed towards the first entrance and exhaust second air of a second speed. The chassis may further include a tunnel structure contiguous to the air intake structure. The tunnel structure may include a second entrance with a third cross-sectional area and a second exit with a fourth cross-sectional area. The tunnel structure may be effective to receive the second air from the air intake structure. A size of the third cross-sectional area of the second entrance may be less than a size of the fourth cross-sectional area of the second exit. A second relationship between the third cross-sectional area and the fourth cross-sectional area may be effective to expand the second air into expanded air of a third speed, wherein the third speed is less than the second speed. The air intake structure and the tunnel structure in combination may be effective to create a second drag coefficient for the frame when the frame moves through space, where the second drag coefficient may be less than the first drag coefficient.

In some examples, methods for reducing drag coefficient in a vehicle are generally described. The vehicle may include a frame, a motor and one or more set of wheels. The methods may include receiving first air directed towards a first entrance of an air intake structure at a first speed. The air intake structure may be disposed upon the frame. The frame ma include a first drag coefficient as the frame moves through space. The air intake structure may include the first entrance with a first cross-sectional area and a first exit with a second cross-sectional area. The methods may further include transforming, by the air intake structure, the first air into second air of a second speed. The methods may further include directing the second air to flow from the air intake structure to a tunnel structure. The tunnel structure may be contiguous to the air intake structure. The tunnel structure may include a second entrance with a third cross-sectional area and a second exit with a fourth cross-sectional area. The tunnel structure may be disposed upon the frame of the vehicle. A size of the third cross-sectional area of the second entrance may be less than a size of the fourth cross-sectional area of the second exit. The methods may further include expanding, by the tunnel structure, the second air into expanded air. A second relationship between the third cross-sectional area of the second entrance and the fourth cross-sectional area of the second exit may be effective to cause the expansion of the second air into the expanded air. A third speed of the expanded air may be less than the second speed of the second air. The methods may further include creating, by the air intake structure and tunnel structure in combination, a second drag coefficient for the frame as the frame moves through space, where the second drag coefficient may be less than the first drag coefficient.

In some examples, a drag coefficient reducing system for a vehicle is generally described. The vehicle may include a frame, where the frame may include a first drag coefficient when the frame moves through space. The drag coefficient reducing system may include an air intake structure. The air intake structure may include a first entrance with a first cross-sectional area and a first exit with a second cross-sectional area. A first relationship between the first and second cross-section area may be effective to receive first air directed towards the first entrance and exhaust second air of a second speed. The drag coefficient reducing system may further include a tunnel structure contiguous to the air intake structure. The tunnel structure may include a second entrance with a third cross-sectional area and a second exit with a fourth cross-sectional area. The tunnel structure may be effective to receive the second air from the air intake structure. A size of the third cross-sectional area of the second entrance may be less than a size of the fourth cross-sectional area of the second exit. A second relationship between the cross-sectional area of the second entrance and the cross-sectional area of the second exit may be effective to expand the second air into expanded air of a third speed. The third speed may be less than the second speed. The air intake structure and the tunnel structure in combination may be effective to create a second drag coefficient for the frame when the frame moves through space, where the second drag coefficient may be less than the first drag coefficient.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1A illustrates a vehicle relating to a vehicle drag reduction and electricity generation system;

FIG. 1B illustrates a top cut-away view of an air flow component relating to a vehicle drag reduction and electricity generation system;

FIG. 1C illustrates a side perspective view of the air flow component relating to a vehicle drag reduction and electricity generation system;

FIG. 2A illustrates the vehicle of FIG. 1 with additional detail relating to a drag reduction and electricity generation system;

FIG. 2B illustrates a side perspective view of the air flow component of FIG. 1 with additional detail relating to a drag reduction and electricity generation system;

FIG. 2C illustrates a side perspective view of an example system of FIG. 1 with additional detail relating to a drag reduction and electricity generation system;

FIG. 2D illustrates a side cut-away view of the example system of FIG. 1 with additional detail relating to a drag reduction and electricity generation system;

FIG. 2E illustrates a front view of the example system of FIG. 1 with additional detail relating to a drag reduction and electricity generation system;

FIG. 3A illustrates the vehicle of FIG. 1 with additional detail relating to a drag reduction and electricity generation system;

FIG. 3B illustrates a side perspective view of the air flow component of FIG. 1 with additional detail relating to a drag reduction and electricity generation system;

FIG. 3C illustrates a side perspective view of the example system of FIG. 1 with additional detail relating to a drag reduction and electricity generation system;

FIG. 3D illustrates a front cut-away view of the example system of FIG. 1 with additional detail relating to a drag reduction and electricity generation system;

FIG. 3E illustrates a side cut-away view the example system of FIG. 1 with additional detail relating to a drag reduction and electricity generation system;

FIG. 7A illustrates the vehicle of FIG. 1 with additional detail relating to a vehicle drag reduction and electricity generation system;

FIG. 7B illustrates a top cut-away view of an air flow component relating to a vehicle drag reduction and electricity generation system;

FIG. 7C illustrates a side perspective view of the air flow component relating to a vehicle drag reduction and electricity generation system;

FIG. 8A illustrates the vehicle of FIG. 1 with additional detail relating to a vehicle drag reduction and electricity generation system;

FIG. 8B illustrates a top cut-away view of an air flow component relating to a vehicle drag reduction and electricity generation system;

FIG. 8C illustrates a side perspective view of the air flow component relating to a vehicle drag reduction and electricity generation system;

FIG. 9A illustrates the vehicle of FIG. 1 with additional detail relating to a vehicle drag reduction and electricity generation system;

FIG. 9B illustrates a top cut-away view of an air flow component relating to a vehicle drag reduction and electricity generation system;

FIG. 9C illustrates a side perspective view of the air flow component relating to a vehicle drag reduction and electricity generation system;

Figure 4:
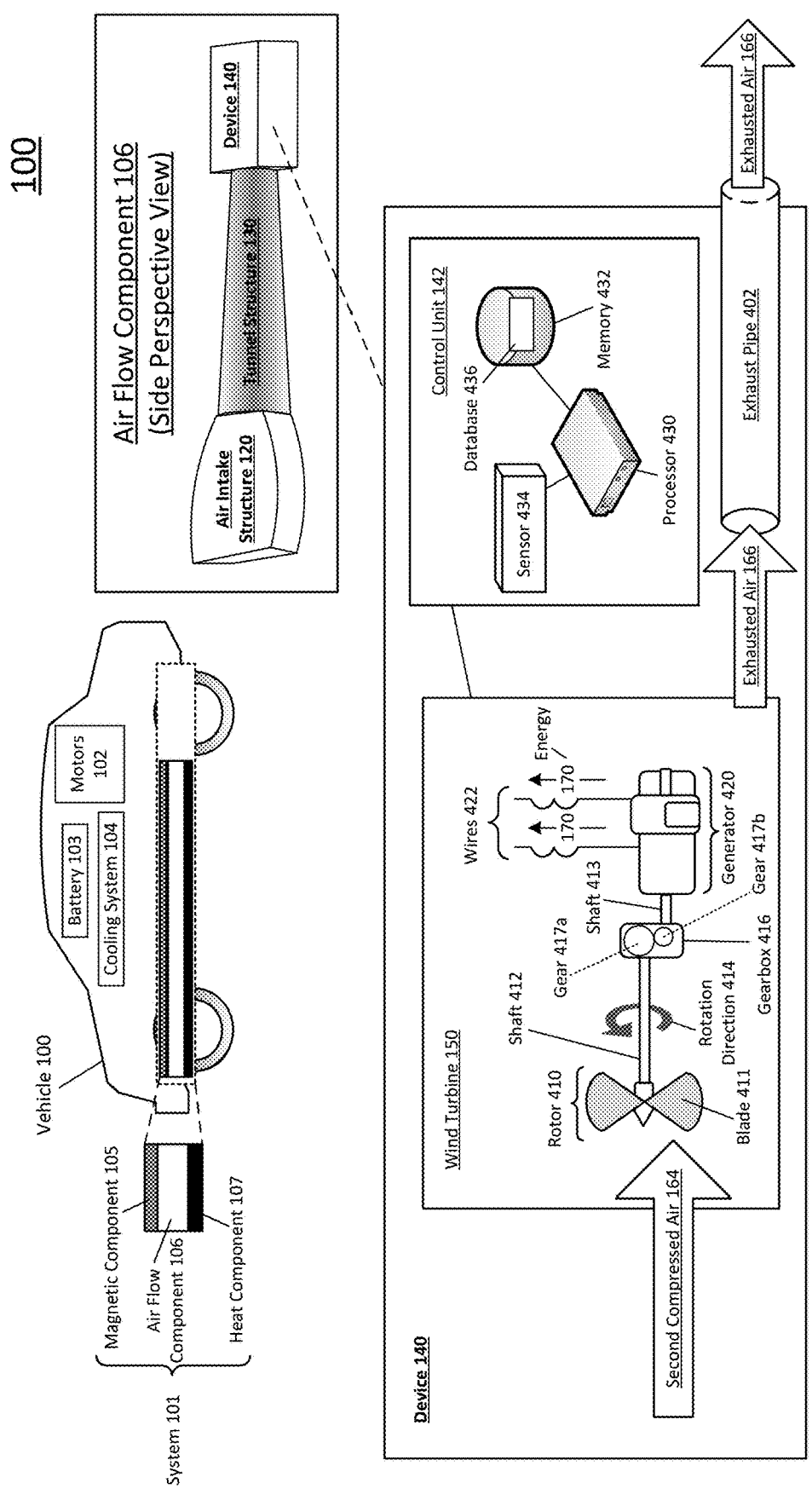
FIG. 4 illustrates the vehicle of FIG. 1 with additional detail relating to a device of a drag reduction and electricity generation system.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1, including FIGS. 1A, 1B, and 1C, illustrates a vehicle, a top cut-away view of an air flow component, and a side perspective view of the air flow component, respectively, related to a vehicle drag reduction and electricity generation system, arranged in accordance with at least some embodiments described herein. Vehicle 100 may include system 101, where system 101 may include components to facilitate generation of electricity (further described below). In some examples, vehicle 100 may be an electric vehicle, a gasoline vehicle, etc. Vehicle 100 may include one or more motors 102, a battery 103, a cooling system 104, and/or chassis 112, etc. In examples where vehicle 100 may be an electric vehicle, motors 102 may be electric motors and may be configured to propel vehicle 100. In some examples where vehicle 100 may be a gasoline vehicle, motors 102 may be associated with a combustion engine of vehicle 100. Battery 103 may be configured to provide power to one or more components, such as motors 102 and cooling system 104, or various electronics of vehicle 100. Cooling system 104 may include one or more units and/or components, such as an air conditioning unit, configured to cool an interior of vehicle 100, one or more radiators configured to cool an engine of vehicle 100, etc. In some examples, cooling system 104 may include components configured to cool motors 102, battery 103, and/or a combustion engine of vehicle 100. Chassis 112 may include a frame 113, front wheels 114a, 114b, and rear wheels 115a, 115b, where front wheels 114a, 114b, and rear wheels 115a, 115b may be coupled to frame 113. In some examples, chassis 112 may include a transmission couple to at least one of front wheels 114a, 114b, and rear wheels 115a, 115b. Frame 113 may be a part of chassis 112, where a body of vehicle 100 may be mounted on frame 113. In some examples, system 101 may be disposed in chassis 112 and may be placed on top of frame 113 of chassis 112, where frame 113 may support a weight of system 101.

System 101 may include a magnetic component 105, an air flow component 106, and a heat component 107. In some examples, at least a part of magnetic component 105 may be disposed upon at least a part of air flow component 106. In some examples, at least a part of air flow component 106 may be disposed upon at least a part of heat component 107. Magnetic component 105 may include one or more magnetic elements, such as electromagnets, configured to produce respective magnetic fields (further described below). Heat component 107 may include one or more heating elements, such as heat exchanger tubes, configured to provide heat of respective temperatures in system 101 (further described below). Heat exchanger tubes in heat component 107 may include coolant fluids. In examples where vehicle 100 may be an electric vehicle, chassis 112 may define a void sufficiently large enough to house system 101. In examples where vehicle 100 may be a gasoline vehicle with an engine towards a back of vehicle 100, chassis 112 may similarly define a void sufficiently large enough to house system 101.

Focusing on FIG. 1B, air flow component 106 may include one or more structures, such as one or more air intake structures ("air intake") 120 and/or a tunnel structure ("tunnel") 130, where an air intake structure 120 and/or tunnel structure 130 may be configured to be in communication with a device 140. Air intake structure 120 may include walls effective to define an opening, such that air intake structure 120 may be effective to receive air 160, where air 160 may be air directed towards vehicle 100 and/or an entrance of air intake structure 120. In some examples, air intake structure 120 may receive air 160 directed towards vehicle 100 when vehicle 100 is idled or when vehicle 100 is in motion. In examples where vehicle 100 may be idled, a pressure difference between an interior of air intake structure 120 and outside of vehicle 100 may cause air 160 to flow towards an entrance of air intake structure 120 such that air intake structure 120 may receive air 160. In examples where vehicle 100 may be in motion, the pressure difference between the interior of air intake structure 120 and outside of vehicle 100, along with movements of vehicle 100, may cause air 160 to flow towards an entrance of air intake structure 120 such that air intake structure 120 may receive air 160. As a result of air 160 entering air intake structure 120 while vehicle 100 is in motion, a drag coefficient of vehicle 100 may be reduced. In some examples, air flow component 106 may include more than one air intake structures. In examples where air flow component 106 includes more than one air intake structures, each air intake structure may be contiguous to an entrance of tunnel structure 130. In some examples, when air flow component 106 includes more than one air intake structures, each air intake structure may receive a respective portion of air 160. Moreover, each air intake structure may be of a respective size and/or shape, etc.

In some examples, a shape of air intake structure 120 may be curved in order to increase an aerodynamic efficiency of an air flow of air 160. In some examples, air intake structure 120 may resemble a funnel, such as a hollow structure including a wide entrance and a narrow exit. In some examples, air intake structure 120 may be curved in a nonlinear manner such that air intake structure 120 resembles a bowl-shaped funnel. In some examples, a width of air intake structure 120 may extend from front wheel 114a to front wheel 114b. A difference between the sizes, such as cross sectional areas, of a wide entrance and a narrow exit of air intake structure 120 may produce a pressure difference between the wide entrance and the narrow exit. The pressure difference between the wide entrance and the narrow exit of air intake structure 120 may cause air 160 to flow in an air flow direction 109 towards tunnel structure 130. In some examples, as air 160 flow in air flow direction 109, a speed of air 160 may increase along air flow direction 109 since a cross sectional area of the interior of air intake structure 120 is decreasing along air flow direction 109. In some examples, the walls of an interior of air intake structure 120 may compress air 160 into first compressed air 162, where first compressed air 162 may flow at a speed higher than a speed of air 160 as first compressed air 162 leaves air intake structure 120.

In some examples, tunnel structure 130 may be positioned in air flow component 106 such that tunnel structure 130 is between front wheels 114a, 114b, and rear wheels 115a, 115b of chassis 112. Tunnel structure 130 may include walls effective to define an entrance or an opening such that tunnel structure 130 may receive air, such as first compressed air 162. In some examples, a shape of tunnel structure 130 may be curved in order to increase an aerodynamic efficiency of an air flow of first compressed air 162. In some examples, tunnel structure 130 may be curved in a linear manner such a cross-sectional area of an interior of tunnel structure 130 decreases along air flow direction 109. In some examples, tunnel structure 130 may be a tube shaped structure, such as a hollow conical frustum, including one or more sections, where each section may be of a different size, such as a diameter or a cross sectional area. For example, focusing on FIG. 1B and FIG. 1C, a cross sectional area of a section 132 of tunnel structure 130 may be greater than a cross sectional area of a section 134 of tunnel structure 130. In some examples, as first compressed air 162 flows in air flow direction 109, a speed of first compressed air 162 may increase along air flow direction 109 since a cross sectional area of the interior of tunnel structure 130 is decreasing along air flow direction 109. In some examples, walls of an interior of tunnel structure 130 may compress first compressed air 162 into second compressed air 164, where second compressed air 164 may flow at a speed higher than a speed of first compressed air 162 as second compressed air 162 enters device 140. In some examples, device 140 may be detached from tunnel structure 130 such that second compressed air 162 may be exhausted as exhausted air 166 to facilitate a reduction of drag coefficient experienced by vehicle 100.

As will be described in more detail below, the shape and the varying cross sectional areas of air intake structure 120 and tunnel structure 130 may produce a pressure difference between two or more points along the interiors of air intake structure 120 and tunnel structure 130 in order to drive air, such as air 160, first compressed air 162, second compressed air 164, towards device 140 in air flow direction 109. Also further described below, in addition to pressure difference between points along interiors of air intake structure 120 and tunnel structure 130, magnetic component 105 and heat component 107 may facilitate the drive of air 160 towards device 140 in air flow direction 109.

Device 140 may be an energy generation device configured to generate energy 170 (further described below) and/or manage second compressed air 164. In the example depicted in FIG. 1B, device 140 may include a control unit 142 and/or a wind turbine 150. Control unit 142 may be configured to control and/or manage wind turbine 150. As will be described in more detail below, control unit 142 may control wind turbine 150 to transform a first portion of second compressed air 164 into energy 170. Controller 142 may be further configured to distribute energy 170 among components of vehicle 100. Energy 170 may be electricity effective to power components of vehicle 100, such as charging battery 103, or providing power for motors 102, cooling system 104, and magnetic component 105, etc. A second portion of second compressed air 164 may be exhausted outside of vehicle 100 as exhausted air 166.

In examples where vehicle 100 is a gasoline vehicle, device 140 may be associated with a combustion engine of vehicle 100, such that tunnel structure 130 may be contiguous to the combustion engine. In an example, the combustion engine may receive second compressed air 164 from tunnel structure 130. Second compressed air 164 received at the combustion engine may be an oxidizer for the combustion engine, such that a combustion of fuel and air may occur inside of the combustion engine. In some examples, control unit 142 of device 140 may control an amount of second compressed air 164 being provided to a combustion engine of vehicle 100. In examples where vehicle 100 is a fuel cell vehicle, second compressed air 164 may be a source of oxygen for a fuel cell engine to power motor 102. In examples where vehicle 100 is a hybrid vehicle, wind turbine 150 may provide energy to battery 103 and second compressed air 164 may serve as an oxidizer for a combustion engine of the hybrid vehicle. As will be described in more detail below, an efficiency of wind turbine 150 may be based on a flow speed of second compressed air 164 when device 140 receives second compressed air 164. The flow speed of second compressed air 164 may be based on a size and/or shape of air intake structure 120 and tunnel structure 130, magnetic fields produced by magnetic component 105, and heat provided by heat component 107.

FIG. 2, including FIGS. 2A, 2B, 2C, 2D, and 2E, illustrates vehicle 100 of FIG. 1, a side perspective view of air flow component 106, and a side perspective view of system 101 of FIG. 1, a side cut-away view of system 101 of FIG. 1, and a front view of system 101 of FIG. 1, respectively, with additional detail relating to a drag reduction and electricity generation system, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

Focusing on FIG. 2C, air intake structure 120 may receive air 160 directed towards vehicle 100 and/or an entrance 210 of air intake structure 120. In some examples, vehicle 100 may include a filter 204 effective to filter out debris from air 160 prior to air intake structure 120 receiving air 160. Air 160 may enter air intake structure 120 at entrance 210 of air intake structure 120 and may leave at an exit 212 of air intake structure 120 as first compressed air 162. In the example depicted in FIG. 2C, the shape of air intake structure 120 may be curved such that a cross-sectional area of air intake structure 120 may decrease along air flow direction 109, and such that a size or a cross sectional area of entrance 210 may be greater than a size or a cross sectional area of exit 212. The cross sectional area difference between entrance 210 and exit 212 of air intake structure 120 may produce a pressure difference between entrance 210 and exit 212. Since, in the example, entrance 210 is of a relatively large cross sectional area than exit 212, a pressure at entrance 210 may be higher than a pressure at exit 212. The pressure difference between entrance 210 and exit 212 may cause air 160 to flow in air flow direction 109 towards tunnel structure 130.

As mentioned above, at least a portion of magnetic component 105 may be disposed upon at least a portion of air flow component 106. Similarly, at least a portion of air flow component 106 may be disposed upon at least a portion of heat component 107. In the examples depicted in FIGS. 2C, 2D, and/or 2E, magnetic element 220 may be disposed upon at least a portion of air intake structure 120, and at least a portion of air intake structure 120 may be disposed upon heating element 230. Magnetic element 220 may be a part of magnetic component 105 (shown in FIG. 2A) and heating element 230 may be a part of heat component 107 (shown in FIG. 2A). Focusing on FIG. 2E, heating element 230 may be located under a bottom of air intake structure 120. Magnetic element 220 may be located on a surface of air intake structure 120 such that magnetic element 220 may surround, or encompass a top, and at least one side, of air intake structure 120. Focusing on FIG. 2C, magnetic element 220 may be effective to produce a magnetic field 222 and heating element 230 may be effective to provide heat 232. In some examples, magnetic element 220 may be electromagnets including coils, where current may run through the coils to produce magnetic field 222. In some examples, current running through coils of magnetic component 105 may be generated by device 140 (further described below). Magnetic element 220 may be arranged such that a north pole of magnetic field 222 may be directed towards an interior of air intake structure 120. In some examples, heating element 230 may include heat exchanger tubes connected to cooling system 104 of vehicle 100.

In some examples, heating element 230 may include heat exchanger tubes connected to one or more radiators of cooling system 104 or components of vehicle 100. In an example, heated coolant fluid may flow from the radiators or the components to heating element 230. Heating element 230 may provide heat 232 to an interior of air intake structure 120, such as by transferring heat 232 from the heated coolant fluids. As a result of providing heat 232 to the interior of air intake structure 120, a temperature of the heated coolant fluid flowing through heating element 230 may decrease along air flow direction 109. In some examples, heating element 230 may be contiguous to one or more components of vehicle 100, such as motor 102, battery 103, a transmission of vehicle 100, a combustion engine of vehicle 100, etc. In examples where heating element 230 may be contiguous to components of vehicle 100, coolant fluid within heating element 230 may receive heat from the components to increase a temperature of coolant fluid within heating element 230. As a result of the decreasing temperature of coolant fluids within heating element 230 along air flow direction 109, heating element 230 may facilitate a cooling of the one or more components. For example, a first end of heating element 230 near entrance 210, and a second end of heating element 230 near exit 212, may both be contiguous to a combustion engine of vehicle 100. As combustion engine operates, coolant fluid near the first end may be heated to a first temperature. The first temperature of the coolant fluid within heating element 230 may decrease along air flow direction 109, such that the coolant fluid near exit 212 may be at a second temperature. The coolant fluid at the second temperature may facilitate a cooling of the combustion engine since heating element 230 may provide heat at the second temperature that is lower temperature than the first temperature.

Focusing on FIG. 2D, air 160 may flow in a random pattern such as an initial flow 260 after entering air intake structure 120. Heating element 230 may apply heat 232 on air 160 to increase a temperature of air 160. A temperature increase of air 160 may decrease a viscosity of air 160, where a decrease in viscosity may cause air 160 to flow in a relatively orderly pattern such as a laminar flow 262, and may increase a flow speed of air 160. In addition to heat 232, magnetic field 222 may also be applied on air 160 to decrease the viscosity of air 160 such that air 160 may flow in an orderly pattern such as laminar flow 262, and increase the flow speed of air 160. In the example depicted by FIG. 2C, as a result of the application of magnetic field 222 and heat 232, the flow speed of air 160 at entrance 210 may be lower than the flow speed of first compressed air 162 at exit 212. As the flow speed of air 160 increase along air flow direction 109, a pressure along air flow direction 109 in an interior of air intake structure 120 may decrease based on fluid dynamics principles such as the Venturi effect.

Focusing on FIG. 2E, an interior of air intake structure 120 may include one or more fans 270 (including fan 270a, 270b) at initial positions 272 (including positions 272a, 272b). In some examples, initial positions 272 may be near entrance 212, a top, a bottom, one side, and/or both sides of the interior of air intake structure 120. Fans 270 may be attached to a respective actuator, such as a servo motor. Actuators attached to fans 270 may be controlled by device 140. Device 140 may control actuator to move fans 270 from initial positions 272 to positions different from initial positions 272. In an example, device 140 may detect that vehicle 100 is moving at a speed below a speed threshold, such as "10 miles per hour (MPH)". In response to detecting that vehicle 100 is moving at a speed lower than "10 MPH", device 140 may control the actuators to move fans 270 to positions different from initial position 272. For example, device 140 may control the actuators to move fans 270 to positions near a center of the cross-sectional area of entrance 212 such that fans 270 may facilitate a collection of air 160 even if vehicle 100 may be idled or moving a speed lower than "10 MPH". In some examples, device 140 may be configured to detect a temperature of coolant inside of heat element 230. In response to the temperature of the coolant inside of heat element 230 exceeding a particular temperature threshold, device 140 may control the actuators to and/or move fans 270 to positions different from initial positions 272 such that fans 270 may facilitate a cooling of the interior of air intake 120. In some examples, fans 270 may be further positioned in an interior of tunnel structure 130 and similarly, may facilitate collection of first compressed air 162 and cooling of coolant near tunnel structure 130.

As will be described in more detail below, arrangements of heating element 230 relative to other heating elements of heat component 107 may further increase the flow speed of air 160. Similarly, arrangements of magnetic element 220 relative to other magnetic elements of magnetic component 105 may also further increase the flow speed of air 160.

FIG. 3, including FIGS. 3A, 3B, 3C, 3D, and 3E, illustrates vehicle 100 of FIG. 1, a side perspective view of air flow component 106, and a side perspective view of system 101 of FIG. 1, a front cut-away view of system 101 of FIG. 1, and a side cut-away view of system 101 of FIG. 1, respectively, with additional detail relating to a drag reduction and electricity generation system, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

Focusing on FIG. 3B, tunnel structure 130 may receive first compressed air 162 from air intake 120. First compressed air 160 may enter tunnel structure 130 at an entrance 310 of tunnel structure 130 and may leave at an exit 312 of tunnel structure 130. In the example depicted in FIG. 3B, a cross-sectional area of tunnel structure 130 may decrease along air flow direction 109, and such that a size or a cross sectional area of entrance 310 may be greater than a size or a cross sectional area of exit 312. In examples where tunnel structure 130 may be defined by hollow conical frustum, a diameter 311 of entrance 310 may be greater than a diameter 313 of exit 312. The difference between cross sectional areas of entrance 310 and exit 312 may produce a pressure difference between entrance 310 and exit 312. Since, in the example, a cross sectional area of entrance 310 is larger than a cross sectional area of exit 312, a pressure at entrance 310 may be higher than a pressure at exit 312. The pressure difference between entrance 310 and exit 312 may cause first compressed air 162 to flow in air flow direction 109 towards device 140.

As mentioned above, at least portion of magnetic component 105 may be disposed upon at least a portion of air flow component 106. Similarly, at least a portion of air flow component 106 may be disposed upon at least a portion of heat component 107. In the examples depicted in FIGS. 3C, 3D, and 3E, magnetic elements 320, 322, 324 may be disposed upon at least a portion of tunnel structure 130, and at least a portion of tunnel structure 130 may be disposed upon heating elements 330, 332. Magnetic elements 320, 322, 324 may each be a part of magnetic component 105 (shown in FIG. 3A) and heating elements 330, 332 may each be a part of heat component 107 (shown in FIG. 3A). Focusing on FIG. 3C, heating element 330, 332 may each be located under a bottom of tunnel structure 130. In some examples, heating elements 330, 332, may be curved such that heating elements 330, 332, may surround, or encompass, at least a portion of the bottom of tunnel structure 130. An amount of heat provided by heating elements 330, 332, may increase or decrease with a surface area of the portion being surrounded by curved heating elements 330, 332. Magnetic elements 320, 322, 324 may each be located on a surface of tunnel structure 130 such that each one of magnetic elements 320, 322, 324 may surround, or encompass a top, and at least one sides, of tunnel structure 130. In some examples, magnetic element 320 may surround a portion of air intake structure 120 and a portion of tunnel structure 130, such that magnetic element 320 may surround a junction of exit 212 of air intake structure 120 and entrance 310 of tunnel structure 130.

Focusing on FIG. 3E, magnetic element 320 may be arranged such that a north pole of magnetic element 320 may be directed away from an interior of tunnel structure 130. Based on the arrangement of magnetic element 220 and magnetic element 320, magnetic field 222 may be directed from magnetic element 220 (which may be disposed upon air intake structure 120) towards magnetic element 320 through the interior of tunnel structure 130, as depicted by FIG. 3E. The direction of magnetic field 222 may facilitate a reduction of viscosity of first compressed air 162 in order to cause first compressed air 162 to flow in air flow direction 109, and in order to increase the flow speed of first compressed air 162, such that laminar flow 262 of first compressed air 162 may be maintained and/or enhanced.

Similarly, magnetic element 322 may be arranged such that a north pole of magnetic element 322 may be directed towards the interior of tunnel structure 130. Magnetic element 324 may be arranged such that a north pole of magnetic element 320 may be directed away from the interior of tunnel structure 130. Based on the arrangement of magnetic elements 322, 324, a magnetic field 326 may be produced and directed from magnetic element 322 towards magnetic element 324 through the interior of tunnel structure 130, as depicted by FIG. 3E. The direction of magnetic field 326 may facilitate a reduction of viscosity of first compressed air 162 in order to cause first compressed air 162 to flow in air flow direction 109 and in order to increase the flow speed of first compressed air 162, such that laminar flow 262 of first compressed air 162 may be maintained and/or enhanced. As will be further described below, an arrangement of different magnetic elements may facilitate production of pressure differences along interiors of air intake structure 120 and/or tunnel structure 130 in order to drive air 160 and/or first compressed air 162 towards device 140. In some examples, addition magnetic elements may be coupled to air intake 120 and/or tunnel 130, and may be positioned in an arbitrary arrangement.

Focusing on FIGS. 3C and 3E, heating elements 330, 332 may include heat exchanger tubes connected to one or more radiators of cooling system 104 or components of vehicle 100. Heated coolant fluid may flow from the radiators or the components to heating elements 330, 332. Heating elements 330, 332 may provide heat 331, 333 to an interior of tunnel structure 130, such as by transferring heat 331, 333 from the heated coolant fluids. As a result of providing heat 331, 333 to the interior of tunnel structure 130, a temperature of the heated coolant fluid flowing through heating elements 330, 332 may decrease along air flow direction 109. In some examples, heating elements 330, 332 may each be contiguous to one or more components of vehicle 100, such as motor 102, battery 103, a transmission of vehicle 100, a combustion engine of vehicle 100, etc. In examples where heating elements 330, 332 may each be contiguous to components of vehicle 100, coolant fluid within heating elements 330, 332 may receive heat from the components to increase a temperature of the coolant fluid within heating elements 330, 332. As a result of the decreasing temperature of coolant fluids within heating elements 330, 332 along air flow direction 109, heating elements 330, 332 may facilitate a cooling of the one or more components.

In some examples, heating elements 330, 332 may be connected to each other such that heating element 330 may receive heated coolant fluid prior to heating element 332 receiving the heated coolant fluid. In examples where heating elements 330, 332 are connected to each other, a temperature of heat 331 provided by heating element 330 may be higher than a temperature of heat 333 provided by heating element 332. Since heat 331 is of a higher temperature than heat 333, heat 331 may reduce the viscosity of first compressed air 162 more effectively than heat 333. The temperature difference between heat 331, 333 may drive first compressed air 162 to flow in air flow direction 109 and may increase a flow speed of first compressed air 162, such that laminar flow 262 of first compressed air 162 may be maintained and/or enhanced. In some examples, heat 232, 331, 333 may also increase a temperature of the interiors of air intake structure 120 and/or tunnel structure 130. The increased interior temperature may reduce an attraction force between air molecules of first compressed air 162 and surface molecules of the interiors of air intake structure 120 and tunnel structure 130. The reduced attraction force may cause a reduction of friction between air molecules of air 160 and inside walls of the interiors of air intake structure 120 and tunnel structure 130, which may lead to an increase flow speed and laminar flow of first compressed air 162.

As a result of the application of magnetic fields 222, 326 and heat 331, 333, the flow speed of first compressed air 162 at entrance 310 may be lower than the flow speed of second compressed air 164 at exit 312. As the flow speed of first compressed air 162 increase along air flow direction 109, pressure along air flow direction 109 in an interior of tunnel structure 130 may decrease based on fluid dynamics principles such as the Venturi effect. As will be described in more detail below, as a result of driving first compressed air 162 to flow faster along air flow direction 109, the increased flow speed of second compressed air 164 may facilitate an improvement of an efficiency of device 140.

FIG. 4 illustrates the example system 100 of FIG. 1 with additional detail relating to a device of a drag reduction and electricity generation system, arranged in accordance with at least some embodiments described herein. FIG. 4 is substantially similar to system 100 of FIG. 1, with additional details. Those components in FIG. 4 that are labeled identically to components of FIG. 1 will not be described again for the purposes of clarity.

As depicted in FIG. 4, device 140 may include control unit 142 and wind turbine 150. Wind turbine 150 may be configured to transform at least a portion of second compressed air 164 into energy 170. Wind turbine 150 may include at least a rotor 410, a shaft 412, a shaft 413, a gearbox 416, and/or a generator 420. Rotor 410 may include one or more blades 411, and rotor 410 may be contiguous to shaft 412. Shaft 412 may be contiguous to gearbox 416, where gearbox 416 may include one or more gears 417a, 417b, and each gear may be of a respective size. Gearbox 416 may be contiguous to shaft 413, where shaft 413 may be contiguous to generator 420. In the example depicted, shaft 412 may be contiguous to gear 417a and shaft 413 may be contiguous to gear 417b. In some examples, wind turbine 150 may include additional components such as a yaw motor, a brake, a wind vane, etc.

In the example depicted in FIG. 4, device 140 or wind turbine 150 may receive second compressed air 164 from tunnel structure 130. Second compressed air 160 may exert a force on blades 411 to cause rotor 410 to rotate in a rotation direction 414. In response to rotor 410 rotating in rotation direction 414, shaft 412 may also rotate in rotation direction 414. A rotation of shaft 412 may cause gear 417a to rotate at a first rotation speed, where gear 417a may rotate in a same direction as shaft 412. Gear 417a may be in communication with gear 417b, where the rotation gear 417a may cause gear 417b to rotate in a rotation direction opposite from rotation direction 414. In the example depicted in FIG. 4, gear 417a may be larger than gear 417b such that gear 417b may rotate at a second rotation speed higher than the first rotation speed of 417a. A rotation of gear 417b may cause shaft 413 to rotate in a same rotation direction of gear 417b, where shaft 413 may rotate at a speed higher than a rotation speed of shaft 412. A rotation of shaft 413 may cause generator 420 to rotate with shaft 413, where a rotation of generator 420 may produce energy 170.

Generator 420 or wind turbine 150 may distribute energy 170 to one or more components of vehicle 100 through one or more wires 422. In an example, wind turbine 150 may distribute energy 170 to battery 103 of vehicle 100 in order to charge battery 103. In another example, wind turbine 150 may distribute energy 170 to cooling system 104 to provide electricity to units, such as air conditioning units, of cooling system 104. In another example, wind turbine 150 may distribute energy 170 to magnetic component 105 to provide current to electromagnets of magnetic component 105 such that magnetic component 105 may produce magnetic fields. Energy 170 may also be distributed within vehicle 100 to provide power for a lighting system, radio, or various electronics, of vehicle 100.

Control unit 142 may include a processor 430, a memory 432, and/or one or more sensors 434, configured to be in communication with each other. Processor 430 may be configured to control operations of sensors 434 and/or wind turbine 150. Processor 430 may be further configured to manage data stored in memory 432, where memory 432 may include a database 436 effective to store data relating to wind turbine 150. Sensors 434 may include one or more sensing mechanisms effective to detect performance of wind turbine 150 such that control unit 142 may manage second compressed air 164. In some examples, control unit 142 may be configured to be in communication with components such as a temperature sensor, a tachometer (such as revolutions per minute indicator), a humidity sensor, a computer, an engine control unit, body control module, etc. associated with vehicle 100, such that data may be exchanged among control unit 142 and the components to facilitate an implementation of system 101.

In an example, sensors 434 may include an anemometer configured to measure a speed of second compressed air 164. Processor 430 may be configured to retrieve the speed of second compressed air 164 detected by sensors 434, and may record the speed of second compressed air 164 at various times and situations in database 436 of memory 432. Sensors 434 may further include an energy sensor configured to measure an amount of energy, which may be associated with energy 170, generated by wind turbine 150. Processor 430 may be configured to retrieve the amount of energy generated by wind turbine 150, and may record amounts of energy 170 under various times and situations in database 436 of memory 432. In an example, processor 430 may be configured to compare and/or evaluate the speed of second compressed air 164 and/or the amount of energy generated by wind turbine 150 to evaluate an efficiency of wind turbine 150. Processor 430 may be further configured to determine a rotation speed of rotor 410 based on the speed of second compressed air 164. Processor 430 may determine whether the rotation speed of rotor 410 exceeds a threshold. If the rotation speed of rotor 410 exceeds the threshold, processor 430 may facilitate an exhaustion of at least a portion of air 160 through an exhaust pipe 402 of vehicle 100, such that second compressed air 164 may be exhausted as exhausted air 166. In examples where wind turbine 150 includes a brake, if the rotation speed of rotor 410 exceeds the threshold, processor 430 may generate a signal or command to activate the brake to terminate or slow down the rotation of rotor 410, and facilitate exhaustion of second compressed air 164 through exhaustion pipe 402. In some examples, control unit 142 may include mechanisms to detect an air-fuel ratio of a mixture of air and fuel in a combustion engine, and may regulate an amount of second compressed air 164 based on an evaluation of the air-fuel ratio. As will be further described below, controller 142 may be configured to control components in addition to exhaustion pipe 402 to regulate second compressed air 164.

Figure 5:
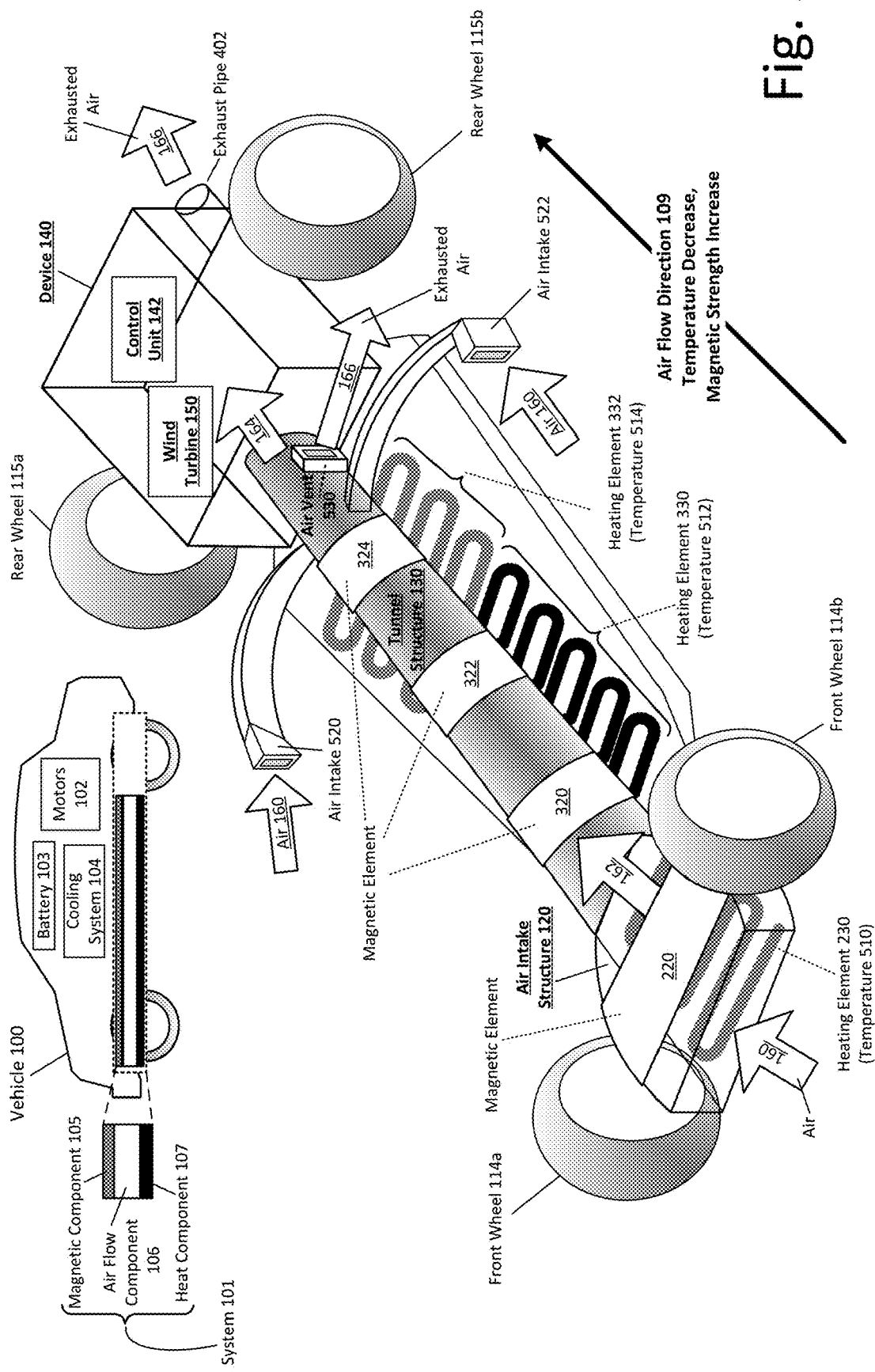
FIG. 5 illustrates the vehicle of FIG. 1 with additional detail relating to a drag reduction and electricity generation system.

FIG. 5 illustrates the example system 100 of FIG. 1 with additional detail relating to a drag reduction and electricity generation system, arranged in accordance with at least some embodiments described herein. FIG. 5 is substantially similar to system 100 of FIG. 1, with additional details. Those components in FIG. 5 that are labeled identically to components of FIG. 1 will not be described again for the purposes of clarity.

As mentioned above, temperature differences between two points along air flow direction 109 may drive air 160, first compressed air 162, and/or second compressed air 164, towards device 140 due to pressure difference. In the example depicted by FIG. 5, a temperature 510 of heat provided by heating element 230 may be greater than a temperature 512 of heat provided by heating element 330. As a result of temperature 510 being greater than temperature 512, air 160 may be driven from air intake structure 120 towards tunnel structure 130 based on the pressure difference produced by a difference between temperatures 510, 512. Similarly, temperature 512 of heat provided by heating element 330 may be greater than a temperature 514 of heat provided by heating element 332. As a result of temperature 512 being greater than temperature 514, first compressed air 162 may be driven from tunnel structure 130 towards device 140 based on the pressure difference produced by a difference between temperatures 512, 514.

As mentioned above, coolant fluid may flow within heating elements 230, 330, 332. In an example, heating element 230 may receive coolant fluid from one or more radiators of vehicle 100. The coolant fluid may flow from heating element 230 to heating element 330, then may further flow from heating element 330 to heating element 332. As shown in the example in FIG. 5, temperature 514 may be lower than temperature 512, and temperature 512 may be lower than temperature 210. Since temperature 514 is a lowest temperature among temperatures 510, 512, 514, heat provided by heating element 332 at temperature 514 may be used as a source to cool components of vehicle 100, such as motors 102, battery 130, etc. In some examples, vehicle 100 may not include radiators and coolant fluids within heating elements may be heated by the components of vehicle 100. In examples where vehicle 100 do not include radiators, cooling system 104 may be implemented with a combination of heating elements 230, 330, 332, air intake structure 120, tunnel structure 130, and/or one or more fans associated with air intake structure 120 (shown above in FIG. 2), such that the combination may perform as a system effective to cool components of vehicle 100.

As mentioned above, an arrangement of different magnetic elements may facilitate production of pressure differences between points along air intake structure 120 and/or tunnel structure 130 in order to drive air 160, first compressed air 162, and/or second compressed air 164, towards device 140. In the example depicted in FIG. 5, a magnetic strength of magnetic element 220 may be weakest among the magnetic strengths of magnetic elements 220, 320, 322, 324. A magnetic strength of magnetic element 324 may be strongest among the magnetic strengths of magnetic elements 220, 320, 322, 324. Magnetic strengths of magnetic elements 220, 324, 322, 324 may increase along air flow direction 109 such that a pressure within air intake structure 120 and/or tunnel structure 130 may decrease along air flow direction 109. As a result of decreasing pressure along air flow direction 109, air 160, first compressed air 162, and/or second compressed air 164, may be driven towards device 140. In some examples, positions of magnetic elements 220, 320, 322, 324 may differ from the example depicted in FIG. 5. For example, magnetic element 320 may be positioned at a junction of air intake structure 120 and tunnel structure 130.

In some examples, system 101 may further include additional intakes such as air intake 520 and air intake 522. In examples where vehicle 100 may be idled, in addition to air intake 120, air intakes 520, 522 may also receive air 160 such that system 101 may operate with sufficient amount of incoming air. In some examples, system 101 may further include one or more air vents, such as an air vent 530. Air vent 530 may be an aperture defined on a surface of tunnel structure 130, and may include an electronically or a mechanically controlled door, such as a gate or flap. Air vent 530 may be controlled by control unit 142 of device 140. As mention above, control unit 142 may control an exhaustion of a portion of second compressed air 164 through exhaust pipe 402 such that second compressed air 164 may be exhausted as exhausted air 166. Control unit 142 may be further configured to control the exhaustion of exhausted air 166 through air vent 530 in situations where control unit 142 need to control wind turbine 150 under situations mentioned above. For example, if an air-fuel ratio detected by control unit 142 indicates an abundance of air, control unit 142 may operate air vent 530, such as by opening a gate of air vent 530, to exhaust second compressed air 164 as exhausted air to maintain an appropriate air-fuel ratio.

A system in accordance with the present disclosure may improve vehicle performance by reducing a drag of a vehicle in motion. The system in accordance with the present disclosure also may utilize available space in a chassis of electric vehicles such that the space would not be unused. The system in accordance with the present disclosure may also reduce a drag of vehicles and transform incoming air into energy to enhance energy efficiency of vehicles. For example, by utilizing magnetic elements described above, air received by the system in accordance with the present disclosure may be driven towards a wind turbine at a faster pace such that an efficiency of the wind turbine may be improved. Similarly, by utilizing heating elements described above, air received by the system in accordance with the present disclosure may be driven towards the wind turbine at a faster pace such that the efficiency of the wind turbine may be improved. Further, the heating elements described above may utilize heat provided from other parts of the vehicle such that the energy associated with the heat may be reused.

Figure 6:
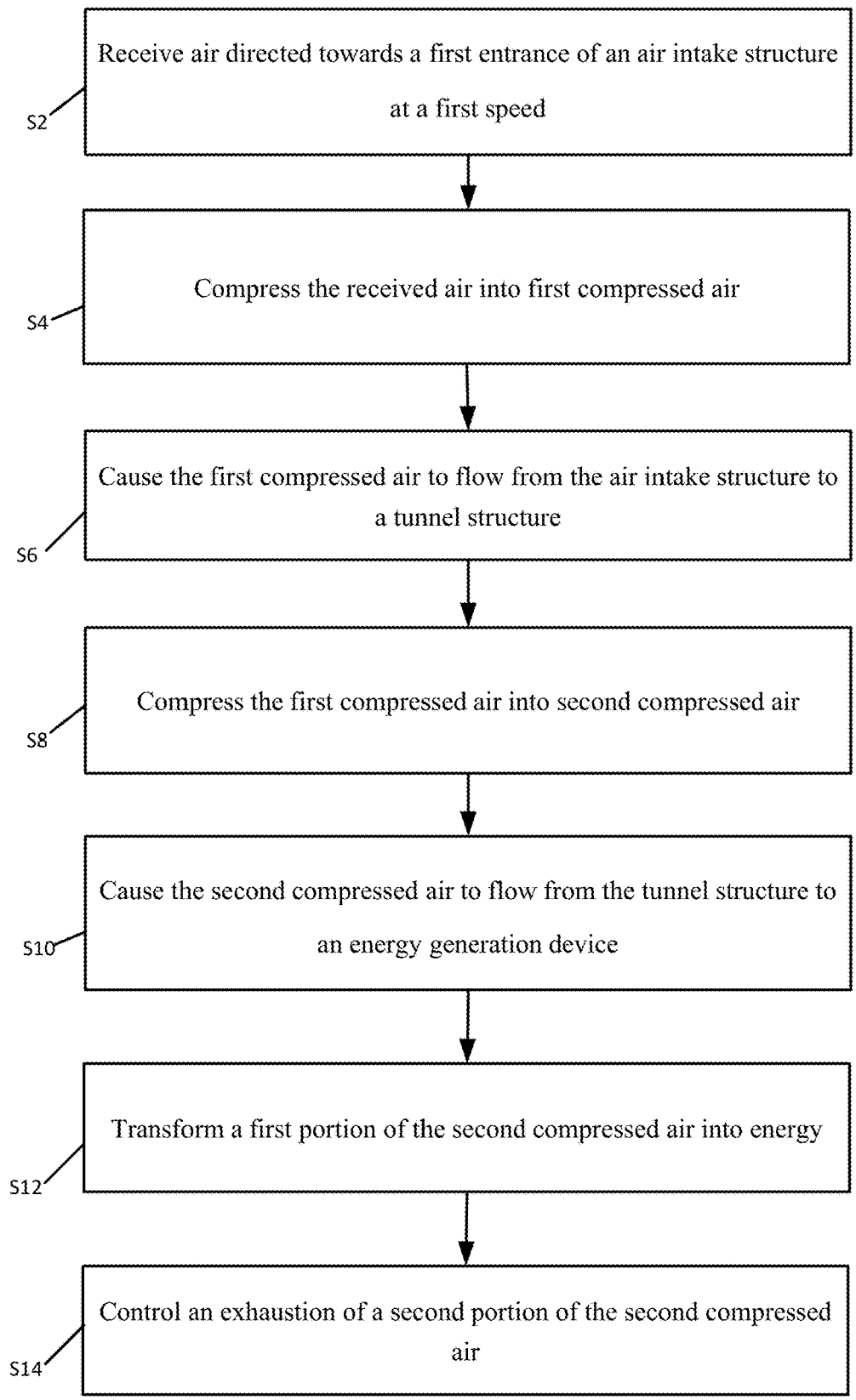
FIG. 6 illustrates a flow diagram for an example process to implement a vehicle drag reduction and electricity generation system.

FIG. 6 illustrates a flow diagram for an example process to implement vehicle drag reduction and electricity generation system, arranged in accordance with at least some embodiments presented herein. The process in FIG. 6 could be implemented using, for example, system 100 discussed above. An example process may include one or more operations, actions, or functions as illustrated by one or more of blocks S2, S4, S6, S8, S10, S12, and/or S14. Although illustrated as discrete blocks, various blocks may be divided into additional blocks, combined into fewer blocks, or eliminated, depending on the desired implementation.

Processing may begin at block S2, "Receive air directed towards a first entrance of an air intake structure at a first speed". At block S2, a vehicle may receive air directed towards a first entrance of an air intake structure at a first speed. The air intake structure may be disposed upon a chassis of the vehicle. The air intake structure may include the first entrance and a first exit, where a first size of the first entrance may be greater than a second size of the first exit. The air intake structure may be curved in a nonlinear manner.

Processing may continue from block S2 to block S4, "Compress the received air into first compressed air". At block S4, the vehicle may compress the received air into first compressed air. A first difference between the first size of the first entrance and the second size of the first exit may be effective to cause the compression of the received air into the first compressed air. A second speed of the first compressed air may be greater than the first speed of the received air. The first difference between the first size of the first entrance and the second size of the first exit may be further effective to cause the second speed to be greater than the first speed. In some examples, the vehicle may produce one or more magnetic fields. The vehicle may apply the one or more magnetic fields to the received air to increase the first speed of the received air. In some examples, the vehicle may further apply heat at a first temperature to the received air at the air flow component to increase a flow speed of the received air.

Processing may continue from block S4 to block S6, "Cause the first compressed air to flow from the air intake structure to a tunnel structure". At block S6, the vehicle may cause the first compressed air to flow from the air intake structure to a tunnel structure. The tunnel structure may be contiguous to the air intake structure. The tunnel structure may include a second entrance and a second exit. The tunnel structure may be disposed upon the chassis of the vehicle. The tunnel structure may be curved in a linear manner. A third size of the second entrance may be greater than a fourth size of the second exit.

Processing may continue from block S6 to block S8, "Compress the first compressed air into second compressed air". At block S8, the vehicle may compress the first compressed air into second compressed air. A second difference between the third size of the second entrance and the fourth size of the second exit may be effective to cause the compression of the first compressed air into the second compressed air. A third speed of the second compressed air may be greater than the second speed of the first compressed air. The second difference between the third size of the second entrance and the fourth size of the second exit may be further effective to cause the third speed to be greater than the second speed. In some examples, the vehicle may apply the one or more magnetic fields to the first compressed air to increase the second speed of the first compressed air. In some examples, the vehicle may further apply heat at a second temperature to the first compressed air to increase the second speed of the first compressed air.

Processing may continue from block S8 to block S10, "Cause the first compressed air to flow from the tunnel structure to an energy generation device". At block S10, the vehicle may cause the first compressed air to flow from the tunnel structure to an energy generation device. The energy generation device may be configured to be in communication with the tunnel structure.

Processing may continue from block S10 to block S12, "Transform a first portion of the second compressed air into energy". At block S12, the vehicle may transform a first portion of the second compressed air into energy.

Processing may continue from block S12 to block S14, "Control an exhaustion of a second portion of the second compressed air". At block S14, the vehicle may control an exhaustion of a second portion of the second compressed air. In some examples, the vehicle may transmit the energy to a battery of the vehicle.

FIG. 7, including FIGS. 7A, 7B, and 7C, illustrates a vehicle, a top cut-away view of an air flow component, and a side perspective view of the air flow component, respectively, related to the example system 100 of FIG. 1 with additional detail relating to a drag reduction and electricity generation system, arranged in accordance with at least some embodiments described herein. Vehicle 100 may include system 101, where system 101 may include components to facilitate generation of electricity (further described below). In some examples, vehicle 100 may be an electric vehicle, a gasoline vehicle, a locomotive, or a vehicle with other types of engine, etc. Vehicle 100 may include one or more motors 102, a battery 103, a cooling system 104, and/or chassis 112, etc. In examples where vehicle 100 may be an electric vehicle, motors 102 may be electric motors and may be configured to propel vehicle 100. In some examples where vehicle 100 may be a gasoline vehicle, motors 102 may be associated with a combustion engine of vehicle 100. In some examples, motor 102 may correspond to a powertrain that may include one or more components, such that the powertrain may be effective to propel vehicle 100. Other examples of motor 102 may include gasoline engine, diesel engine, or any other type of engines. In some examples, vehicle 100 may be a pneumatic vehicle that may be propelled by air in space, or within a confined space such as a tunnel. Battery 103 may be configured to provide power to one or more components, such as motors 102 and cooling system 104, or various electronics of vehicle 100. Cooling system 104 may include one or more units and/or components, such as an air conditioning unit, configured to cool an interior of vehicle 100, one or more radiators configured to cool an engine of vehicle 100, etc. In some examples, cooling system 104 may include components configured to cool motors 102, battery 103, and/or a combustion engine of vehicle 100. Chassis 112 may include a frame 113, front wheels 114a, 114b, and rear wheels 115a, 115b, where front wheels 114a, 114b, and rear wheels 115a, 115b may be coupled to frame 113. Frame 113 may include a drag coefficient when the frame 113 moves through space, such as when frame 113 and/or vehicle 100 moves on a surface (e.g., road), or when frame and/or vehicle 100 moves in an opened area. In some examples, chassis 112 may include a transmission couple to at least one of front wheels 114a, 114b, and rear wheels 115a, 115b. In some examples, chassis 112 may include one or more sets of front wheels and/or rear wheels. For example, chassis 112 may include one set of front wheels and more than one set of rear wheels. In another example, chassis 112 may include more than one set of front wheels and one set of rear wheels. In another example, chassis 112 may include one or more sets of wheels located between front wheels 114a, 114b, and rear wheels 1151, 115b. Frame 113 may be a part of chassis 112, where a body of vehicle 100 may be mounted on frame 113. In some examples, system 101 may be disposed in chassis 112 and may be placed on top of frame 113 of chassis 112, where frame 113 may support a weight of system 101. In some examples, system 101 may further be integrated or attached to frame 113.

System 101 may include a magnetic component 105, an air flow component 106, and a heat component 107. In some examples, at least a part of magnetic component 105 may be disposed upon at least a part of air flow component 106. In some examples, at least a part of air flow component 106 may be disposed upon at least a part of heat component 107. Magnetic component 105 may include one or more magnetic elements, such as electromagnets, configured to produce respective magnetic fields (further described below). Heat component 107 may include one or more heating elements, such as heat exchanger tubes, configured to provide heat of respective temperatures in system 101 (further described below). Heat exchanger tubes in heat component 107 may include coolant fluids. In examples where vehicle 100 may be an electric vehicle, chassis 112 may define a void sufficiently large enough to house system 101. In examples where vehicle 100 may be a gasoline vehicle with an engine towards a back of vehicle 100, chassis 112 may similarly define a void sufficiently large enough to house system 101. In examples where vehicle 100 may be a vehicle with an engine towards a front of vehicle 100, chassis 112 may similarly define a void sufficiently large enough to house system 101.

Focusing on FIG. 7B, in some examples, air flow component 106 may include one or more structures, such as one or more air intake structures ("air intake") 700 and/or a tunnel structure ("tunnel") 702, where an air intake structure 700 and/or tunnel structure 702 may be configured to be in communication with device 140 (shown above in FIGS. 1-5). Focusing on FIG. 7B, in some examples, air intake structure 700 may resemble a hollow structure or an arbitrary shape, such as a cylinder, a tube, a cube, a rectangle, a hollow conical frustum, etc. In the example shown in FIG. 7B, a size of a cross-sectional area of an entrance 701 of air intake structure 700 may be less than, or smaller than, a size of a cross-sectional area of an exit 703 of air intake structure 700. A difference between the sizes, such as cross-sectional areas, of the entrance 701 and the exit 703 of air intake structure 700 may produce a pressure difference between the entrance 701 and the exit 703 of air intake structure 700 as air 160 flows in an air flow direction 109. The motion of vehicle 100 and/or the pressure difference between the entrance 701 and the exit 703 of air intake structure 700 may cause air 160 to flow in air flow direction 109 towards tunnel structure 702. In some examples, as air 160 flows in air flow direction 109, a speed of air 160 may decrease along air flow direction 109 because a cross-sectional area of the interior of air intake structure 700 is increasing along air flow direction 109. In some examples, a relationship between the cross-sectional area of the entrance 701 and the cross-sectional area of the exit 703 of air intake structure 700 may transform, or expand, air 160, decreasing the pressure of air 160, into first expanded air 704, where first expanded air 704 may flow at a speed less than, or slower than, a speed of air 160 as first expanded air 704 leaves air intake structure 700.

Continuing with the example shown in FIG. 7B, a shape of tunnel structure 702 may be tapered in order to increase an aerodynamic efficiency of an air flow of first expanded air 704. In some examples, tunnel structure 702 may be tapered in a linear manner such that a cross-sectional area of an interior of tunnel structure 702 increases along air flow direction 109. In some examples, tunnel structure 702 may be a tube shaped structure, such as a hollow conical frustum, including one or more sections, where each section may be of a different size, such as a diameter or a cross-sectional area. For example, focusing on FIG. 7B and FIG. 7C, a cross-sectional area of a section 706 of tunnel structure 702 may be less than, or smaller than, a cross-sectional area of a section 708 of tunnel structure 702. Cross-sectional area of a section 706 of tunnel structure 702 may be greater than or equal to a combined cross-sectional area of the exits 703 of one or more air intake structures 700. In some examples, as first expanded air 704 flows in air flow direction 109, a speed of first expanded air 704 may decrease along air flow direction 109 because a cross-sectional area of the interior of tunnel structure 702 is increased along air flow direction 109. In some examples, walls of an interior of tunnel structure 702 may expand first expanded air 702 decreasing the pressure of first expanded air 702 into second expanded air 710, where second expanded air 710 may flow at a speed less than, or slower than, a speed of first expanded air 704. In examples where tunnel structure 704 is configured to be in communication with device 140, second expanded air 710 may flow into device 140. In some examples, second expanded air 710 may be exhausted outside of vehicle 100 as exhausted air 166 (shown in FIGS. 1-5) to facilitate a reduction of drag experienced by vehicle 100.

In some examples, a temperature of air 160 may decrease as air 160 flows along air flow direction 109 because a cross-sectional area of the interior of air intake structure 700 is increasing along air flow direction 109. An air temperature of first expanded air 704 may be less than an air temperature of air 160. In some examples, air intake structures 700 may include additional exits such that air intake structures 702 may be configured to be in communication with battery 103 of vehicle 100. As first expanded air 704 flows from the additional exits of air intake structure 700 towards battery 103, first expanded air 704 may be effective to facilitate a cooling of battery 103. In some examples, air exited from air intake structure 700 may pass through a temperature control system of battery 103 in order to optimize a temperature of battery 103.

Similarly, in some examples, a temperature of first expanded air 704 may decrease as first expanded air 704 flows along air flow direction 109 because a cross-sectional area of the interior of tunnel structure 702 is increasing along air flow direction 109. An air temperature of second expanded air 710 may be less than an air temperature of first expanded air 704. In some examples, tunnel structure 702 may include additional exits such that tunnel structure 702 may be configured to be in communication with battery 103 of vehicle 100. As second expanded air 710 flows from the additional exits of tunnel structure 702 towards battery 103, second expanded air 710 may be effective to facilitate a cooling of battery 103. In some examples, air exited from tunnel structure 702 may pass through a temperature control system of battery 103 in order to optimize a temperature of battery 103.

As mentioned above, at least a portion of magnetic component 105 may be disposed upon at least a portion of air flow component 106. Similarly, at least a portion of air flow component 106 may be disposed upon at least a portion of heat component 107. For example, magnetic element 220 shown in FIGS. 2C, 2D, and/or 2E may be disposed upon at least a portion of air intake structure 700. Similarly, at least a portion of air intake structure 700 may be disposed upon heating element 230 shown in FIGS. 2C, 2D, and/or 2E. Similarly, magnetic elements 320, 322, 324 shown in FIGS. 3C, 3D, and 3E may be disposed upon at least a portion of tunnel structure 702. Similarly, at least a portion of tunnel structure 702 may be disposed upon heating elements 330, 332 shown in FIGS. 3C, 3D, and 3E. Heating elements 330, 332 may each be located under a bottom of tunnel structure 702. In some examples, heating elements 330, 332, may be curved such that heating elements 330, 332, may surround, or encompass, at least a portion of the bottom of tunnel structure 702. Magnetic elements 320, 322, 324 may each be located on a surface of tunnel structure 702 such that each one of magnetic elements 320, 322, 324 may surround, or encompass a top, and at least one sides, of tunnel structure 702. In some examples, magnetic element 320 may surround a portion of air intake of tunnel structure 702, such that magnetic element 320 may surround a junction of exit 703 of air intake structure 700 and entrance 701 of tunnel structure 702.

FIG. 8, including FIGS. 8A, 8B, and 8C, illustrates a vehicle, a top cut-away view of an air flow component, and a side perspective view of the air flow component, respectively, related to the example system 100 of FIG. 1 with additional detail relating to a drag reduction and electricity generation system, arranged in accordance with at least some embodiments described herein. FIG. 8 is substantially similar to system 100 of FIG. 7, with additional details. Those components in FIG. 8 that are labeled identically to components of FIG. 1 will not be described again for the purposes of clarity.

Focusing on an example shown in FIG. 8B, a size of an entrance 701 of air intake structure 700 may be larger than a size of an exit 703 of air intake structure 700. As air 160 flows in air flow direction 109, a speed of air 160 may increase along air flow direction 109 because a cross-sectional area of the interior of air intake structure 700 is decreasing along air flow direction 109. In some examples, a relationship between the cross-sectional area of the entrance 701 and the cross-sectional area of the exit 703 of air intake structure 700 may transform, or compress, air 160, increasing the pressure of air 160, into first compressed air 712, where first compressed air 712 may flow at a speed higher than a speed of air 160 as first compressed air 712 leaves air intake structure 700.

As first compressed air 712 flows in air flow direction 109, a speed of first compressed air 712 may decrease along air flow direction 109 because a cross-sectional area of the interior of tunnel structure 702 is increased along air flow direction 109. In some examples, walls of an interior of tunnel structure 702 may expand first compressed air 712, decreasing the pressure of first expanded air 702, into second expanded air 714, where second expanded air 714 may flow at a speed less than, or slower than, a speed of first compressed air 712. In some examples, second expanded air 714 may be exhausted as exhausted air 166 (shown in FIGS. 1-5) to facilitate a reduction of drag experienced by vehicle 100. In some examples, second expanded air 714 may be fed into an energy generation system (e.g., device 140 as shown in, for example, FIG. 1) to generate power that may be used by vehicle 100.

FIG. 9, including FIGS. 9A, 9B, and 9C, illustrates a vehicle, a top cut-away view of an air flow component, and a side perspective view of the air flow component, respectively, related to the example system 100 of FIG. 1 with additional detail relating to a drag reduction and electricity generation system, arranged in accordance with at least some embodiments described herein. FIG. 9 is substantially similar to system 100 of FIG. 7, with additional details. Those components in FIG. 9 that are labeled identically to components of FIG. 1 will not be described again for the purposes of clarity.

Focusing on an example shown in FIG. 9B, an entrance 701 of air intake structure 700 may be of a same size as an exit 703 of air intake structure 700. The motion of vehicle 100 and a relationship between the cross-sectional area of the entrance 701 and the cross-sectional area of the exit 703 may transform, or facilitate, air 160 to flow in an air flow direction 109 towards tunnel structure 702 as redirected air 716. As redirected air 716 flows in air flow direction 109, a speed of redirected air 716 may decrease along air flow direction 109 because a cross-sectional area of the interior of tunnel structure 702 is increased along air flow direction 109. In some examples, walls of an interior of tunnel structure 702 may expand redirected air 716, decreasing the pressure of redirected air 716, into expanded air 718, where expanded air 718 may flow at a speed less than, or slower than, a speed of redirected air 716 into expanded air 718 as expanded air 718 enters device 140 (as shown in FIG. 1). In some examples, expanded air 718 may be exhausted as exhausted air 166 to facilitate a reduction of drag experienced by vehicle 100.

A system in accordance with the present disclosure may improve vehicle performance by reducing frontal and/or rear drag of a vehicle in motion. The system in accordance with the present disclosure also may utilize available space in a chassis of electric vehicles such that the space would not be unused. The system in accordance with the present disclosure may also reduce a drag of vehicles by redirecting air received under the chassis of a vehicle, such as by funneling air from a front of the vehicle to a rear of the vehicle. Also, when the vehicle is in motion, a vacuum area may be created in the rear section of the vehicle based on a shape of the vehicle. As a result of creation of the vacuum area, the vacuum area may absorb the air exhausted from the system such that a rear drag may be reduced.

Figure 10:
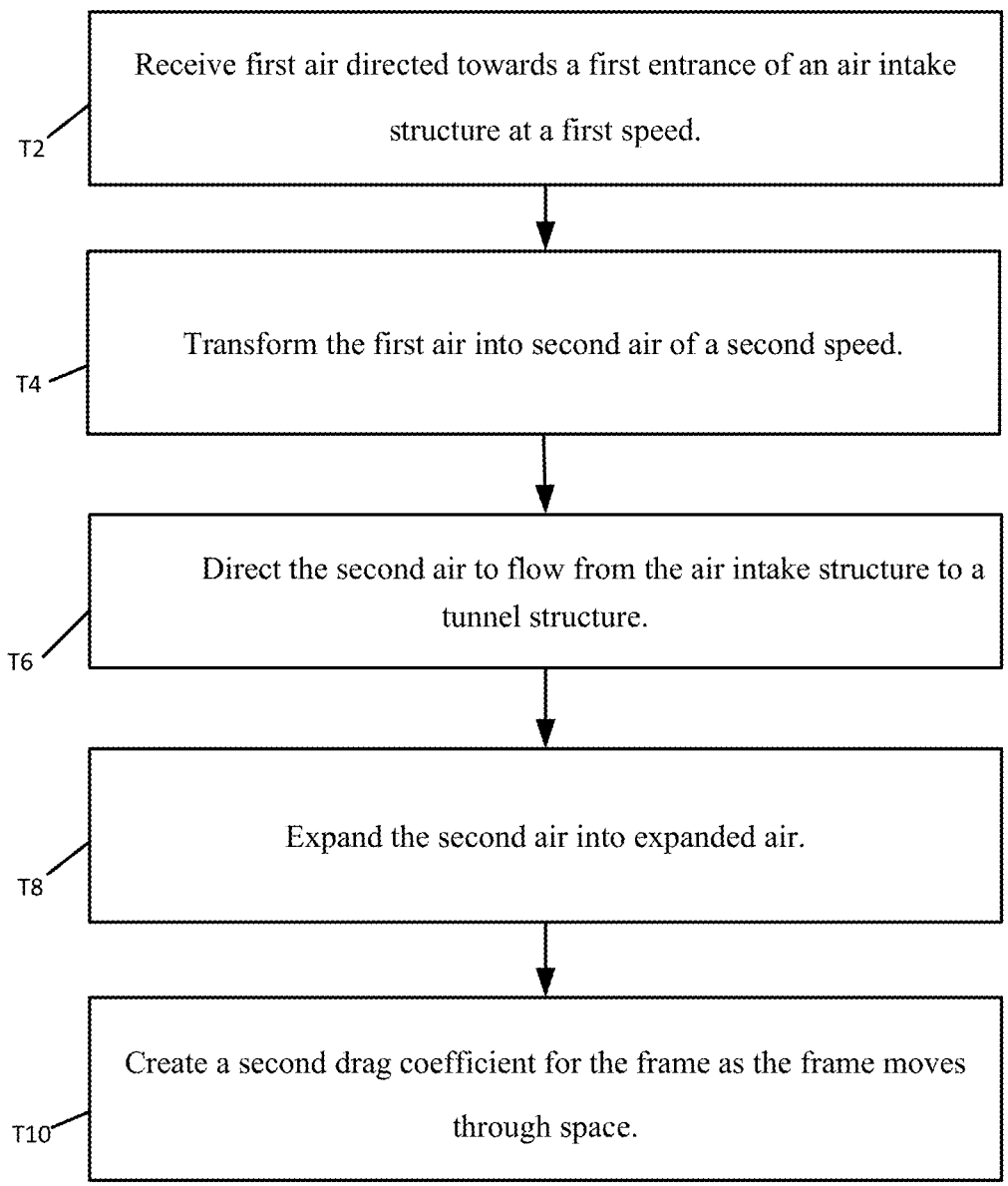
FIG. 10 illustrates a flow diagram for an alternate example process to implement a vehicle drag reduction and electricity generation system.

FIG. 10 illustrates a flow diagram for an example process to implement vehicle drag reduction and electricity generation system, arranged in accordance with at least some embodiments presented herein. The process in FIG. 10 could be implemented using, for example, system 100 discussed above. An example process may include one or more operations, actions, or functions as illustrated by one or more of blocks T2, T4, T6, T8, and/or T10. Although illustrated as discrete blocks, various blocks may be divided into additional blocks, combined into fewer blocks, or eliminated, depending on the desired implementation.

Processing may begin at block T2, "Receive first air directed towards a first entrance of an air intake structure at a first speed." At block T2, air directed towards a first entrance of an air intake structure may be received as first air, where the first air may be received at a first speed. The air intake structure may be disposed upon a frame of a vehicle. The frame may have a first drag coefficient as the frame moves through space. The air intake structure may include the first entrance with a first cross-sectional area and a first exit with a second cross-sectional area.

Processing may continue from block T2 to T4, "Transform the first air into second air of a second speed." At block T4, the air intake structure may transform the first air into second air of a second speed.

Processing may continue from block T4 to T6, "Direct the second air to flow from the air intake structure to a tunnel structure." At block T6, the second air may be directed to flow from the air intake structure to a tunnel structure. The tunnel structure may be contiguous to the air intake structure. The tunnel structure may include a second entrance with a third cross-sectional area and a second exit with a fourth cross-sectional area. The tunnel structure may be disposed upon the frame of the vehicle. A size of the third cross-sectional area of the second entrance may be less than a size of the fourth cross-sectional area of the second exit.

Processing may continue from block T6 to T8, "Expand the second air into expanded air." At block T8, the tunnel structure may expand the second air into expanded air. A second relationship between the third cross-sectional area of the second entrance and the fourth cross-sectional area of the second exit may be effective to cause the expansion of the second air into the expanded air. A third speed of the expanded air may be less than the second speed of the second air.

Processing may continue from block T8 to T10, "Create a second drag coefficient for the frame as the frame moves through space." At block T10, the air intake structure and tunnel structure in combination may create a second drag coefficient for the frame as the frame moves through space. The second drag coefficient may be less than the first drag coefficient.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A vehicle comprising:
   a battery;
   a motor configured to propel the vehicle and to be in communication with the battery;
   a chassis including:
      a frame, the frame having a first drag coefficient when the frame moves through space;
      one or more sets of front wheels coupled to the frame;
      one or more sets of rear wheels coupled to the frame; and
      a transmission coupled to at least one of the set of front wheels and one of the set of rear wheels;
   an air intake structure including a first entrance with a first cross-sectional area and a first exit with a second cross-sectional area, a first relationship between the first and second cross-section area being effective to receive first air directed towards the first entrance and exhaust second air of a second speed, wherein the air intake structure includes a second exit, the air intake structure is contiguous to a battery of the vehicle, and the air intake structure is further effective to direct the second air towards the battery of the vehicle in order to optimize a temperature of the battery of the vehicle; and
   a tunnel structure contiguous to the air intake structure, the tunnel structure including a second entrance with a third cross-sectional area and a third exit with a fourth cross-sectional area, the tunnel structure being effective to receive the second air from the air intake structure, a size of the third cross-sectional area of the second entrance being less than a size of the fourth cross-sectional area of the third exit, a second relationship between the third cross-sectional area and the fourth cross-sectional area being effective to expand the second air into expanded air of a third speed, wherein the third speed is less than the second speed,
   wherein the air intake structure and the tunnel structure in combination are effective to create a second drag coefficient for the frame when the frame is propelled by the motor and moves through space, wherein the second drag coefficient is less than the first drag coefficient.

2. The vehicle of claim 1, wherein a size of the first cross-sectional area of the first entrance is less than a size of the second cross-sectional area of the first exit, the first relationship between the first and second cross-sectional areas is effective to expand the first air at the first speed into the second air of the second speed, and the relationship is further effective to cause the second speed to be less than the first speed.

3. The vehicle of claim 1, wherein a size of the first cross-sectional area of the first entrance is greater than a size of the second cross-sectional area of the first exit, the first relationship between the first and second cross-sectional areas is effective to compress the first air at the first speed into the second air of the second speed, and the relationship is further effective to cause the second speed to be greater than the first speed.

4. The vehicle of claim 1, wherein a size of the first cross-sectional area of the first entrance is equal to a size of the second cross-sectional area of the first exit, and the first relationship between the first and second cross-sectional areas being effective to cause the second speed to be substantially the same as the first speed.

5. The vehicle of claim 1, wherein the system includes:
   an energy generation device configured to be in communication with the tunnel structure, the energy generation device being configured to:
      receive the expanded air from the tunnel structure;
      transform a first portion of the expanded air into energy; and control an exhaustion of a second portion of the expanded air.

6. The vehicle of claim 1, wherein the air intake structure and the tunnel structure are parts of an air flow component, the system further comprising a magnetic component disposed upon at least a portion of the air flow component, the magnetic component being effective to:
produce one or more magnetic fields;
apply the one or more magnetic fields to the first air to increase the first speed of the first air; and
apply the one or more magnetic fields to the second air to increase the second speed of the second air.

7. A method for reducing drag coefficient in a vehicle, wherein the vehicle includes a frame, a motor configured to propel the vehicle, a transmission, and one or more set of wheels, the method comprising:
receiving first air directed towards a first entrance of an air intake structure at a first speed, the air intake structure being disposed upon the frame, the frame having a first drag coefficient as the frame moves through space, the air intake structure including the first entrance with a first cross-sectional area and a first exit with a second cross-sectional area;
transforming, by the air intake structure, the first air into second air of a second speed;
directing the second air towards the battery of the vehicle in order to optimize a temperature of the battery of the vehicle;
directing the second air to flow from the air intake structure to a tunnel structure, wherein the tunnel structure is contiguous to the air intake structure, the tunnel structure including a second entrance with a third cross-sectional area and a second exit with a fourth cross-sectional area, the tunnel structure being disposed upon the frame of the vehicle, a size of the third cross-sectional area of the second entrance being less than a size of the fourth cross-sectional area of the second exit;
expanding, by the tunnel structure, the second air into expanded air, wherein a second relationship between the third cross-sectional area of the second entrance and the fourth cross-sectional area of the second exit is effective to cause the expansion of the second air into the expanded air, and a third speed of the expanded air is less than the second speed of the second air; and
creating, by the air intake structure and tunnel structure in combination, a second drag coefficient for the frame as the frame is propelled by the motor and moves through space, wherein the second drag coefficient is less than the first drag coefficient.

8. The method of claim 7, wherein a size of the first cross-sectional area of the first entrance is less than a size of the second cross-sectional area of the first exit, wherein a relationship between the first cross-sectional area of the first entrance and the second cross-sectional area of the first exit expands the first air, and wherein the second speed of the second air is less than the first speed of the first air.

9. The method of claim 7, wherein a size of the first cross-sectional area of the first entrance is greater than a size of the second cross-sectional area of the first exit, wherein the relationship between the first cross-sectional area of the first entrance and the second cross-sectional area of the first exit compresses the first air, and wherein the second speed of the second air is greater than the first speed of the first air.

10. The method of claim 7, wherein a size of the first cross-sectional area of the first entrance is substantially the same as a size of the second cross-sectional area of the first exit, and wherein the second speed of the second air is substantially the same as the first speed of the first air.

11. The method of claim 7, wherein the method further includes:
communicating, by an energy generation device, with the tunnel structure;
receiving, by the energy generation device, the expanded air from the tunnel structure;
transforming, by the energy generation device, a first portion of the expanded air into energy; and
controlling, by the energy generation device, an exhaustion of a second portion of the expanded air.

12. The method of claim 7, wherein the air intake structure and the tunnel structure are parts of an air flow component, and a magnetic component is disposed upon at least a portion of the air flow component, wherein the method further comprises:
producing, by the magnetic component, one or more magnetic fields;
applying, by the magnetic component, the one or more magnetic fields to the first air increasing the first speed of the first air; and
applying, by the magnetic component, the one or more magnetic fields to the second air increasing the second speed of the second air.

13. A drag coefficient reducing system for a vehicle, wherein the vehicle includes a frame, a motor configured to propel the vehicle, a transmission, and one or more set of wheels, the frame having a first drag coefficient when the frame is propelled by the motor and moves through space, the drag coefficient reducing system comprising:
an air intake structure including a first entrance with a first cross-sectional area and a first exit with a second cross-sectional area, a first relationship between the first and second cross-section area being effective to receive first air directed towards the first entrance and exhaust second air of a second speed, wherein the air intake structure includes a second exit, the air intake structure is contiguous to a battery of the vehicle, and the air intake structure is further effective to direct the second air towards the battery of the vehicle in order to optimize a temperature of the battery of the vehicle; and
a tunnel structure contiguous to the air intake structure, the tunnel structure including a second entrance with a third cross-sectional area and a third exit with a fourth cross-sectional area, the tunnel structure being effective to receive the second air from the air intake structure, a size of the third cross-sectional area of the second entrance being less than a size of the fourth cross-sectional area of the second exit, a second relationship between the cross-sectional area of the second entrance and the cross-sectional area of the third exit being effective to expand the second air into expanded air of a third speed, wherein the third speed is less than the second speed,
wherein the air intake structure and the tunnel structure in combination are effective to create a second drag coefficient for the frame when the frame is propelled by the motor and moves through space, wherein the second drag coefficient is less than the first drag coefficient.

14. The drag coefficient reducing system of claim 13, wherein a size of the first cross-sectional area of the first entrance is less than a size of the second cross-sectional area of the first exit, the first relationship between the first and second cross-sectional areas is effective to expand the first air at the first speed into the second air of the second speed, and the relationship is further effective to cause the second speed to be less than the first speed.

15. The drag coefficient reducing system of claim 13, wherein a size of the first cross-sectional area of the first entrance is greater than a size of the second cross-sectional area of the first exit, the first relationship between the first and second cross-sectional areas is effective to compress the first air at the first speed into the second air of the second speed, and the relationship is further effective to cause the second speed to be greater than the first speed.

16. The drag coefficient reducing system of claim 13, wherein a size of the first cross-sectional area of the first entrance is equal to a size of the second cross-sectional area of the first exit, and the first relationship between the first and second cross-sectional areas being effective to cause the second speed to be substantially the same as the first speed.

17. The drag coefficient reducing system of claim 13, wherein the system includes:

an energy generation device configured to be in communication with the tunnel structure, the energy generation device being configured to:
receive the expanded air from the tunnel structure;
transform a first portion of the expanded air into energy; and
control an exhaustion of a second portion of the expanded air.

18. The drag coefficient reducing system of claim 13, wherein the air intake structure and the tunnel structure are parts of an air flow component, the system further comprising a magnetic component disposed upon at least a portion of the air flow component, the magnetic component being effective to:
produce one or more magnetic fields;
apply the one or more magnetic fields to the first air to increase the first speed of the first air; and
apply the one or more magnetic fields to the second air to increase the second speed of the second air.

* * * * *